(12) United States Patent
Vetrovec

(10) Patent No.: US 10,544,965 B2
(45) Date of Patent: Jan. 28, 2020

(54) MAGNETOCALORIC REFRIGERATOR

(71) Applicant: Jan Vetrovec, Larkspur, CO (US)

(72) Inventor: Jan Vetrovec, Larkspur, CO (US)

( * ) Notice: Subject to any disclaimer, the term of this patent is extended or adjusted under 35 U.S.C. 154(b) by 212 days.

(21) Appl. No.: 15/731,852

(22) Filed: Aug. 15, 2017

(65) Prior Publication Data

US 2018/0045437 A1    Feb. 15, 2018

Related U.S. Application Data

(63) Continuation-in-part of application No. 15/731,270, filed on May 15, 2017.

(60) Provisional application No. 62/494,636, filed on Aug. 15, 2016, provisional application No. 62/600,946, filed on Mar. 6, 2017, provisional application No. 62/601,371, filed on Mar. 20, 2017.

(51) Int. Cl.
*F25B 21/00*     (2006.01)
*F28F 13/00*     (2006.01)
*F28D 15/02*     (2006.01)

(52) U.S. Cl.
CPC ...... *F25B 21/00* (2013.01); *F25B 2321/0021* (2013.01); *F25B 2321/0022* (2013.01); *F28D 15/02* (2013.01); *F28F 2013/008* (2013.01); *Y02B 30/66* (2013.01)

(58) Field of Classification Search
CPC ......... F25B 21/00; F25B 41/04; F25B 19/06; F25B 11/02; F25B 17/02; F25B 13/00; F25B 2321/002; F25B 2321/001; F25B 2321/0022; Y02B 30/66

USPC ......................................................... 62/3.1
See application file for complete search history.

(56) References Cited

U.S. PATENT DOCUMENTS

| | | | | |
|---|---|---|---|---|
| 4,642,994 A | * | 2/1987 | Barclay | F25B 21/00 505/890 |
| 6,588,216 B1 | * | 7/2003 | Ghoshal | F25B 21/00 62/3.1 |
| 9,599,374 B2 | * | 3/2017 | Takahashi | F25B 21/00 |
| 2012/0031109 A1 | * | 2/2012 | Vetrovec | F25B 21/00 62/3.1 |

* cited by examiner

*Primary Examiner* — Frantz F Jules
*Assistant Examiner* — Lionel Nouketcha

(57) ABSTRACT

The invention is for an apparatus and method for a refrigerator and a heat pump based on the magnetocaloric effect (MCE) offering a simpler, lighter, robust, more compact, environmentally compatible, and energy efficient alternative to traditional vapor-compression devices. The subject magnetocaloric apparatus alternately exposes a magnetocaloric material to strong and weak magnetic field while switching heat to and from the material. Action of the heat switches is coordinated with the magnetic field strength to move heat up the thermal gradient. The invention may be practiced with multiple magnetocaloric stages to attain large differences in temperature. Key applications include thermal management of electronics, as well as industrial and home refrigeration, heating, and air conditioning. The invention offers a simpler, lighter, compact, and robust apparatus compared to magnetocaloric devices of prior art. Furthermore, the invention may be run in reverse as a thermodynamic engine, receiving low-level heat and producing mechanical energy.

9 Claims, 37 Drawing Sheets

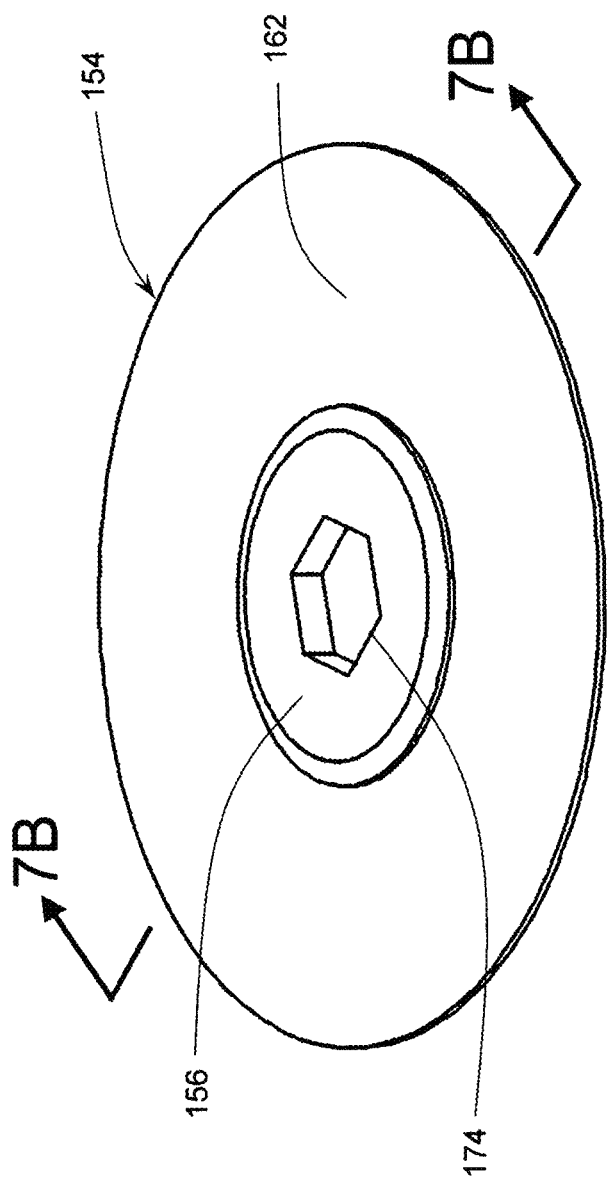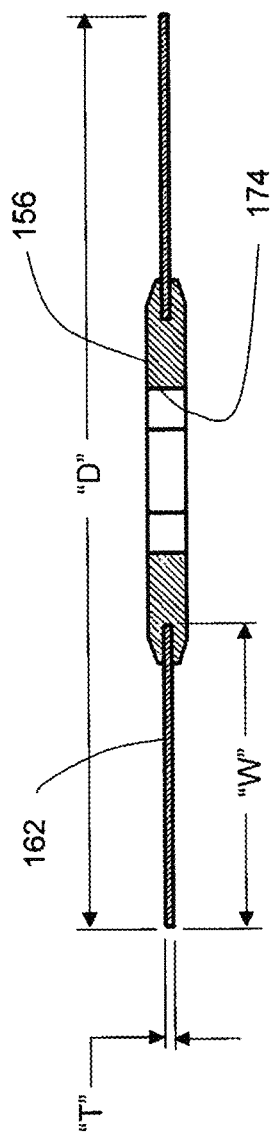
FIG. 7A
FIG. 7B

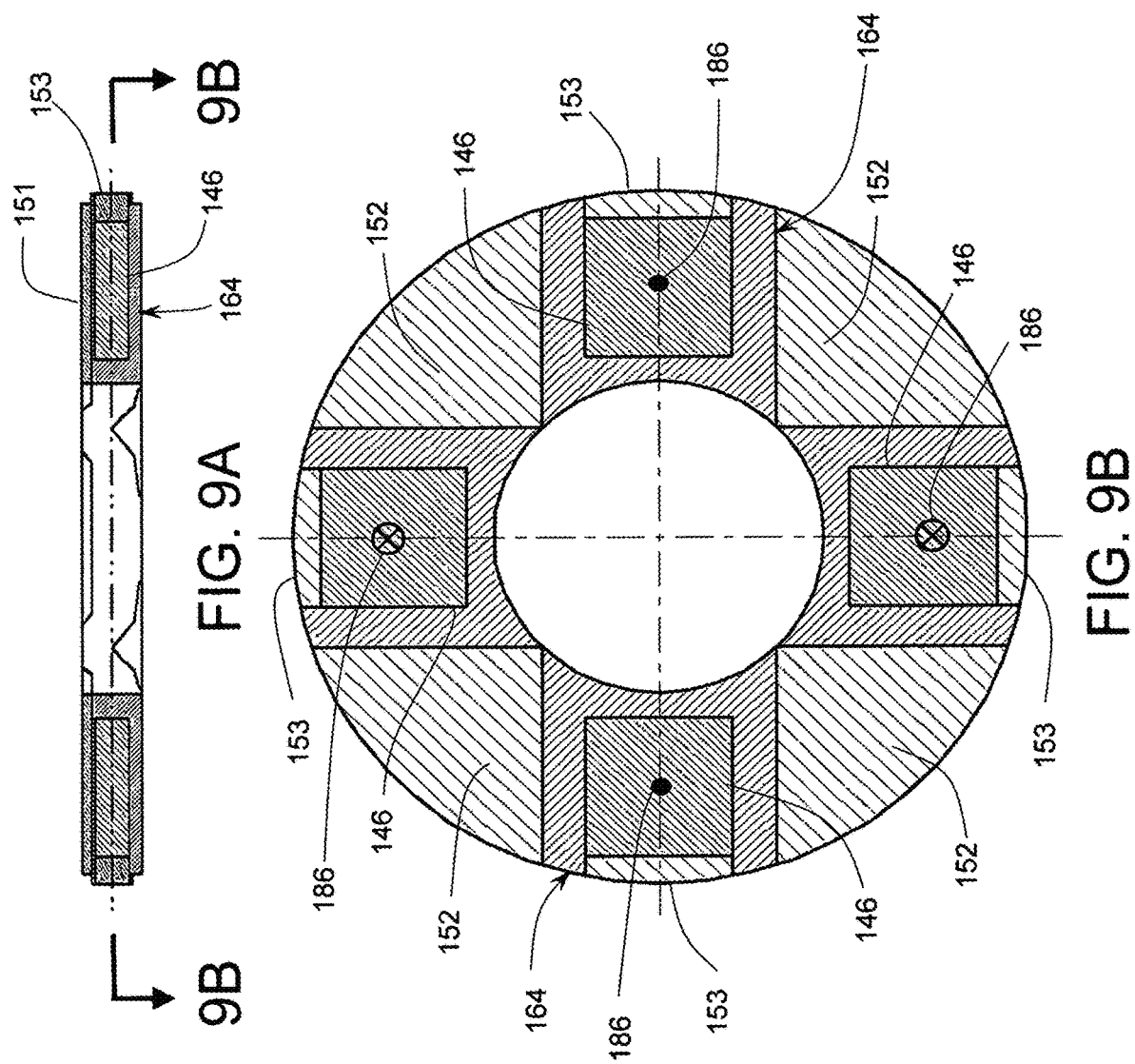

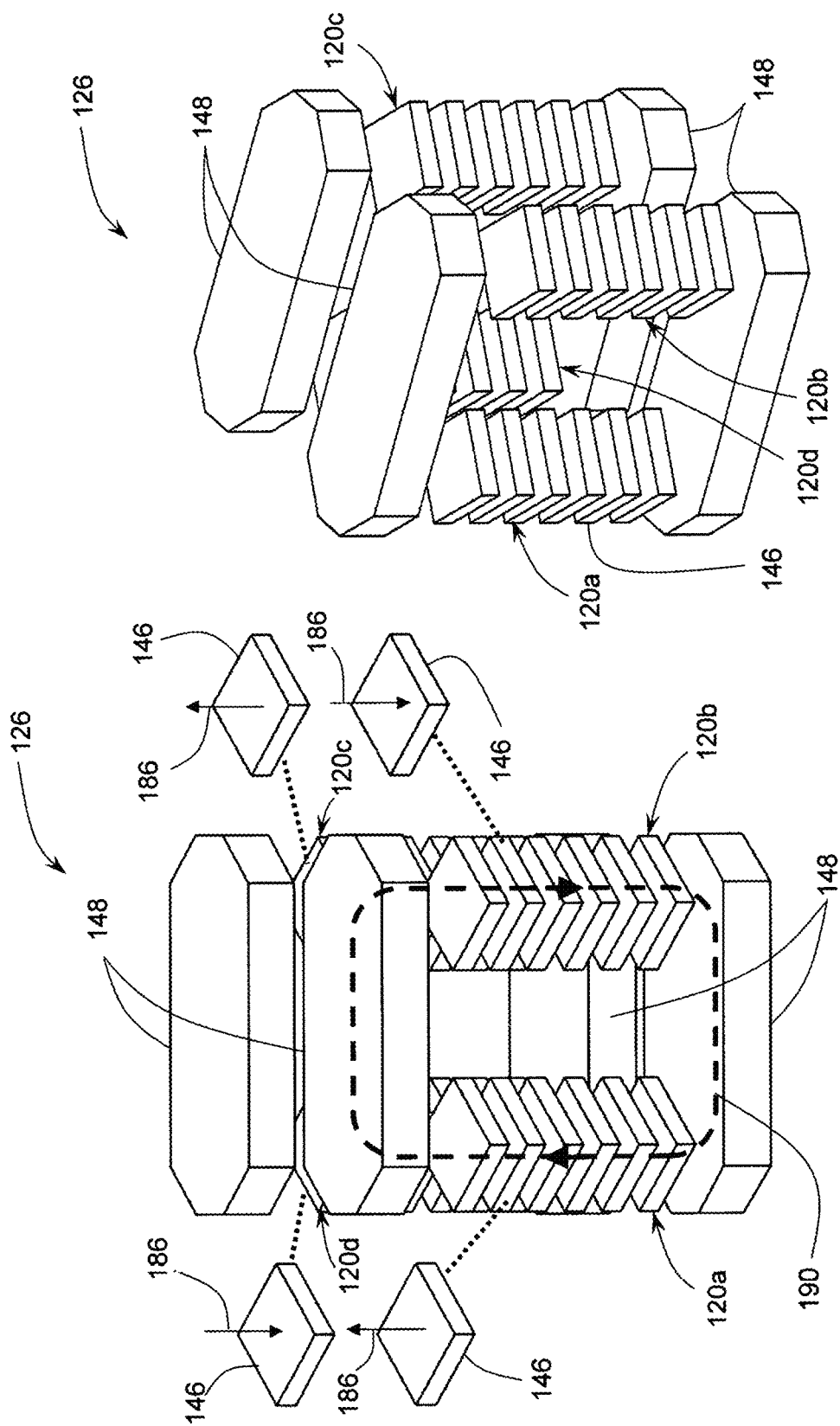

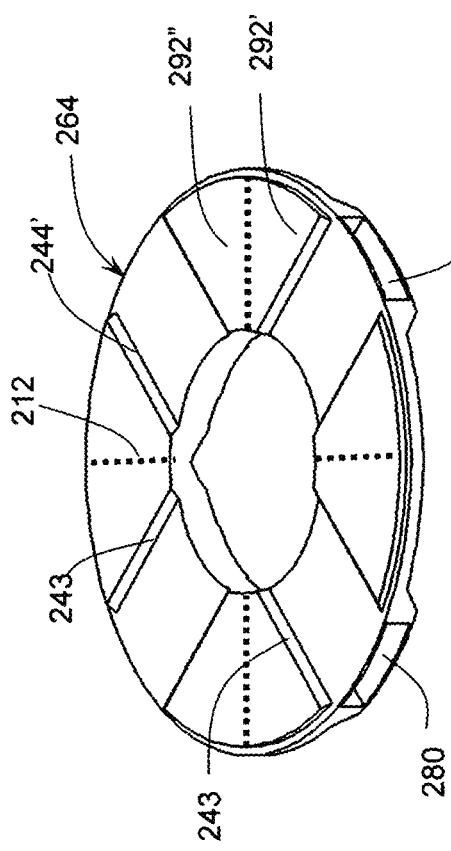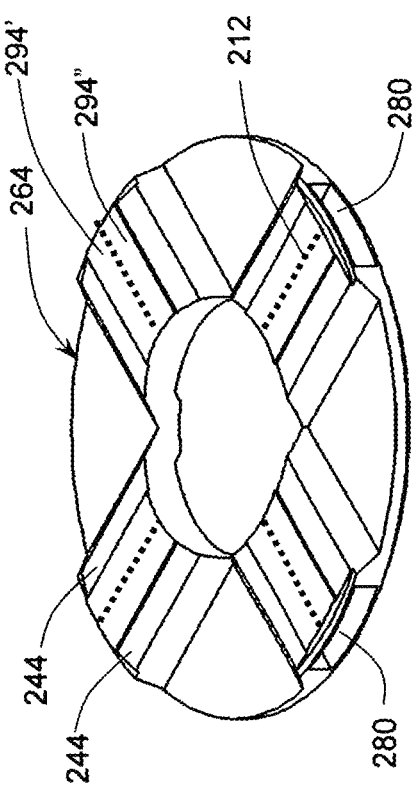

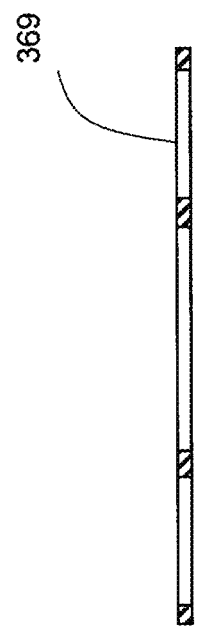
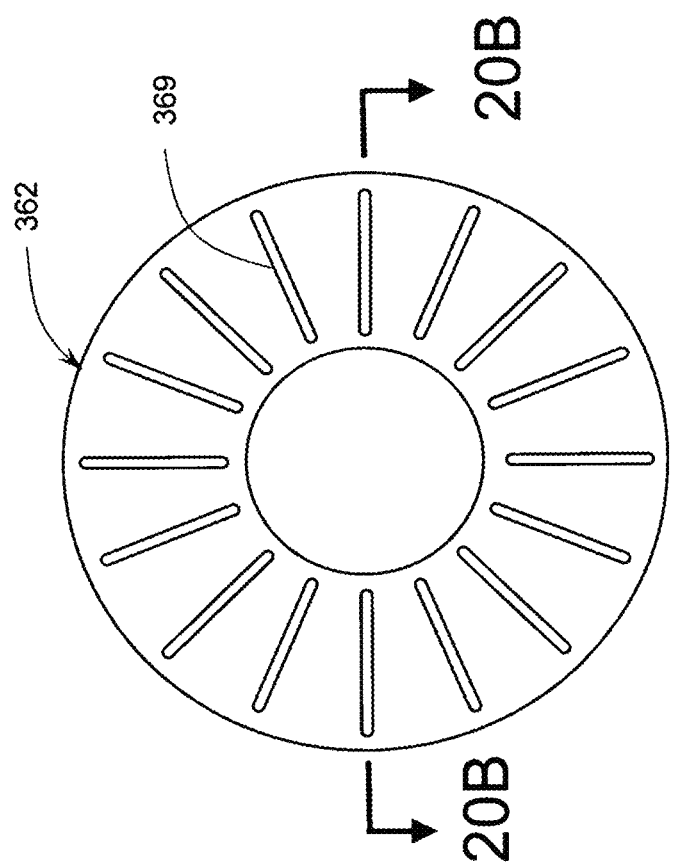

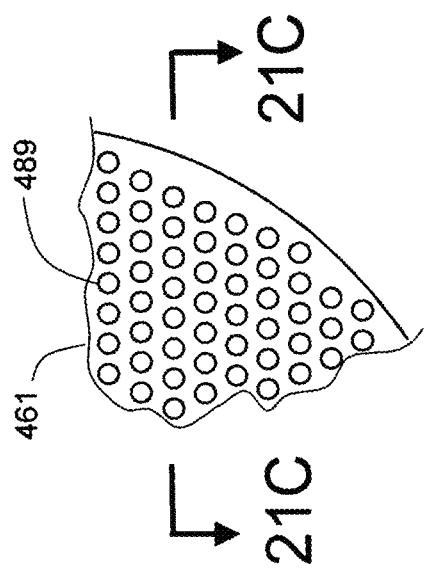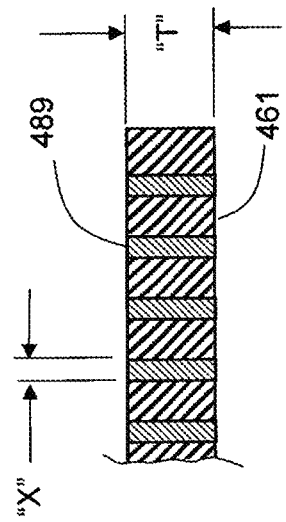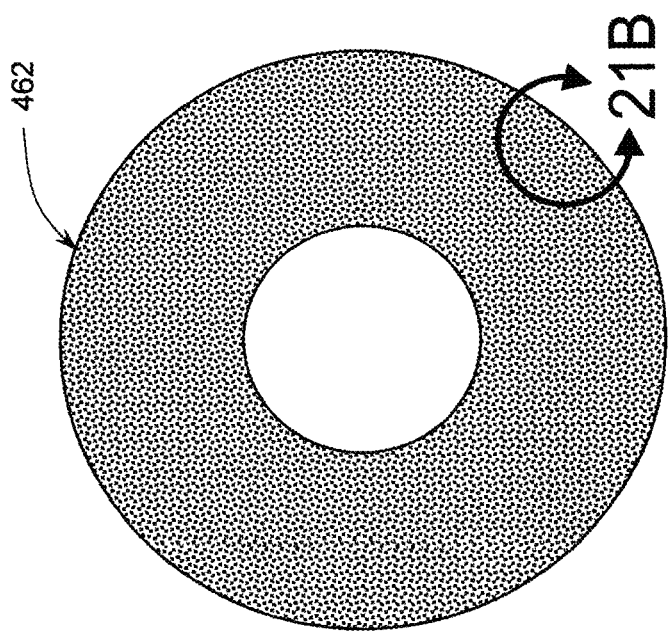
FIG. 21B
FIG. 21C
FIG. 21A

MAGNETOCALORIC REFRIGERATOR

CROSS-REFERENCE TO RELATED APPLICATIONS

This patent application is a continuation-in-part patent application of U.S. Ser. No. 15/731,270 filed on May 15, 2017 and entitled MAGNETOCALORIC REFRIGERATOR, the entire contents of which are hereby expressly incorporated by reference. This application claims priority from the U.S. provisional patent applications U.S. Ser. No. 62/494,636, filed on Aug. 15, 2016 and entitled MAGNETOCALORIC REFRIGERATOR, U.S. Ser. No. 62/600,946, filed on Mar. 6, 2017 and entitled MAGNETOCALORIC REFRIGERATOR, and U.S. Ser. No. 62/601,371, filed on Mar. 20, 2017 and entitled MAGNETOCALORIC REFRIGERATOR, the entire contents of all of which are hereby expressly incorporated by reference.

GOVERNMENT RIGHTS IN THIS INVENTION

This invention was made with U.S. Government support under the U.S. Department of Energy Grant No. DE-SC0013769. The U.S. Government may have certain rights in this invention.

FIELD OF THE INVENTION

This invention relates generally to magnetocaloric machines and more specifically to refrigerators and heat pumps based on the magnetocaloric effect.

BACKGROUND OF THE INVENTION

The subject invention is an apparatus and method for magneto-caloric refrigerator (MCR) offering improved energy efficiency, and reduced emissions of pollutants and greenhouse gases.

According to the U.S. Department of Energy, refrigeration and air conditioning in buildings, industry, and transportation may account for approximately $10^{19}$ joules of yearly primary energy consumption in the U.S.A. Air conditioning is also a major contributor to electric utility peak loads, which may incur high generation costs while frequently using an inefficient and polluting power generation equipment. In addition, peak loads due to air conditioning may be a major factor in poor grid reliability. Most of the conventional air conditioning, heat pumps, and refrigerators may achieve cooling through a mechanical vapor compression cycle (VCC). The thermodynamic efficiency of the VCC is today much less than the theoretical maximum, yet dramatic future improvements in efficiency of the VCC are unlikely. In addition, the hydrofluorocarbon refrigerants used by the VCC today are deemed to be strong contributors to the green house effect. Hence, there is a strong need for innovative approaches to cooling with high efficiencies and net-zero direct green house gas emissions.

The magneto-caloric effect (MCE) describes the conversion of a magnetically induced entropy change in a material to the evolution or absorption of heat, with a corresponding rise or decrease in temperature. In particular, MCE material may heat up when it is immersed in magnetic field and it may cool down when removed from the magnetic field.

All magnetic materials, to a greater or lesser degree, may exhibit an MCE. However, some materials, by virtue of a unique electronic structure or physical nanostructure, may display a significantly enhanced MCE, which may potentially be harnessed for technological application. In contrast to the MCE found in paramagnetic materials, the large MCE exhibited by ferromagnetic materials near their magnetic phase transition temperature (also known as the Curie temperature or Currie point) may render them suitable as working materials for magnetic cooling and heating in the temperature range of about 250 to 350 degrees Kelvin. This may make MCE suitable for commercial, industrial, and home refrigeration, air conditioning, and heat pump applications. For example, gadolinium (Gd) is a ferromagnetic material known to exhibit a significant MCE near its Curie point of about 293 degrees Kelvin. In recent years, a variety of other MCE materials potentially suitable for operation at near room temperature have been discovered. See, for example, "Chapter 4: Magnetocaloric Refrigeration at Ambient Temperature," by Ekkes Bruck in "Handbook of Magnetic Materials," edited by K. H. J. Buschow, published by Elsevier B. V., Amsterdam, Netherlands, in 2008.

One of the very promising novel MCE materials is the intermetallic compound series based on the composition $Gd_5(Si_xGe_{1-x})_4$, where $0.1 \leq x.1 \leq 0.5$, disclosed by K. A. Gschneider and V. K. Pecharsky in U.S. Pat. No. 5,743,095 issued on Apr. 28, 1998 and entitled "Active Magnetic Refrigerants based on Gd—Si—Ge Materials and Refrigeration Apparatus and Process," which is hereby incorporated by reference in its entirety. See also and article by V. K. Pecharsky and K. A. Gschneider, "Tunable Magnetic Refrigerator Alloys with a Giant Magnetocaloric Effect for Magnetic Refrigeration from ~20 to ~290 K," published in Applied Physics Letters, volume 70, Jun. 16, 1997, starting on page 3299. MCE produced by this family of compounds, also referred to as GdSiGe, has been labeled as "giant" because of its relatively large magnitude (reported as 4 to 6 degrees C. per Tesla of magnetic flux density). In particular, the MCE of the GdSiGe alloys may be reversible. Another noteworthy characteristic of the GdSiGe family is that the Curie temperature, may be tuned with compositional variation. This feature allows the working temperature of the magnetic refrigerator to vary from 30 degrees Kelvin to 276 degrees Kelvin, and possibly higher, by adjusting the Si:Ge ratio. Recently, lanthanum-based alloys with compositionally tunable working temperature known as Calorivac-C and Calorivac-H became commercially available from Vacuumscheltze GmbH & Co. KG (VAC) in Hanau, Germany. For the purpose of this disclosure, an MCE material is defined as a suitable material exhibiting a significant MCE.

A magneto-caloric refrigerator (MCR) is a refrigerator based on MCE. MCR offers a relatively simple and robust alternative to traditional vapor-compression cycle refrigeration systems. MCR devices may have reduced mechanical vibrations, compact size, and lightweight. In addition, the theoretical thermodynamic efficiency of MCR may be much higher than for a vapor compression cycle and it may approach the Carnot efficiency. An MCR may employ an MCE material (sometimes referred to as a magnetic refrigerant working material) that may act as both as a "coolant" producing refrigeration and a "regenerator" heating a suitable heat transfer fluid. When the MCE material is subjected to strong magnetic field, its magnetic entropy may be reduced, and the energy released in the process may heat the material to a higher temperature. With the MCE material in magnetized condition, a first stream of heat transfer fluid directed into a thermal contact with the MCE material may be warmed in the process and the heat may be carried away by the flow. When substantial portion of the heat is removed from the MCE material, the fluid flow may be terminated. As the next step, the magnetic field may be reduced, which may cause an increase in magnetic entropy. As a result, the MCE material may be cooled to a lower temperature. A second stream of heat transfer fluid may be directed into a thermal contact with the MCE material where may deposit some of its heat and it may be cooled in the process. When substantial portion of the heat is deposited into the MCE material, the fluid flow may be terminated. Repeating the above steps may result in a semi-continuous operation. One disadvantage of such an MCR is the need for multiple flow loops typically involving pumps, heat exchangers, and significant plumbing.

Despite the apparent conceptual simplicity, there are significant challenges to the development of a practical MCR suitable for commercial applications. This is in-part due to the relatively modest temperature changes (typically few degrees Kelvin per Tesla of magnetic flux density) of the MCE material undergoing MCE transition. In addition, at present time the magnetic field produced by permanent magnets is limited to about 1.5 Tesla maximum. As a result, an MCR using permanent magnets and a single step MCE process may produce only a few degrees Kelvin temperature differential. Many important practical applications such as commercial refrigeration and air conditioning may require substantially higher temperature differentials, typically 30 degrees Kelvin and higher.

One approach to achieving commercially desirable temperature differentials from MCR may use multiple MCR stages (also known as cascades). Heat flow between stages may be managed by heat switches. Each stage contains a suitable MCE material undergoing magnetocaloric transition at a slightly different temperature. While the temperature differential achieved by one stage may be only a few degrees Kelvin, the aggregate operation of multiple stages may produce very large temperature differentials. See, for example, "Thermodynamics of Magnetic Refrigeration" by A. Kitanovski, P. W. Egolf, in International Journal of Refrigeration, volume 29 pages 3-21 published in 2006 by Elsevier Ltd., the entire contents of which are hereby expressly incorporated by reference.

A variety of heat switching approaches have been proposed but none has won commercial acceptance. For example, Ghoshal, in U.S. Pat. No. 6,588,216 entitled "Apparatus and methods for performing switching in magnetic refrigeration systems," issued on Jul. 8, 2003, and incorporated herein by reference in its entirety, discloses switching of thermal path between MCR stages by mechanical means using micro-electro-mechanical systems (MEMS), and/or electronic means using thermoelectric elements. Ghoshal's thermal path switching by MEMS is inherently limited by the poor thermal conductivity of bare mechanical contacts. Ghoshal's thermoelectric switches have very limited thermodynamic efficiency which substantially increases the heat load to the MCR and reduces the overall MCR efficiency.

In summary, there is a need for 1) reducing or eliminating moving parts and pumped fluid loops in MCR systems, 2) simpler and more reliable MCR operation, and 3) means for attaining commercially desirable temperature differentials from MCR. A specific need exists for reliable, low-thermal resistance means for switching of the heat flow to and from the MCE material in staged (cascaded) MCR.

SUMMARY OF THE INVENTION

The present invention provides a magneto-caloric refrigerator (MCR) having one or more stages. The MCR of the subject invention may use MCE material formed as one or more members alternately exposed to strong and weak magnetic field. Exposure to magnetic field may be coordinated by switching of heat to and from the MCE material by heat commutators comprising a thermally conductive core. Thermal communication between the MCE material and the thermally conductive cores is facilitated by a thin layer of suitable thermal interface fluid (TIF) located therebetween. In particular, an MCE material immersed in a weak magnetic field is arranged to be in a good thermal communication with a thermally conductive core of the heat commutator operating at a lower temperature, and an MCE material immersed in a strong magnetic field is arranged to be in a good thermal communication with a thermally conductive core of a commutator operating at a higher temperature.

More specifically, in accordance with one preferred embodiment of the subject invention, the MCR comprises a suitable MCE material formed as one or more annular disks (MCE rings), heat commutators formed as two or more annular disks, and a thermal interface fluid (TIF). The commutators are arranged generally equally spaced on a common axis and affixed in space. The disks of MCE material are placed each between adjacent commutators, arranged to be concentric therewith, and affixed to a common shaft arranged to rotate about them their axis of symmetry. The axial gap between adjacent disks and commutators is arranged to be very small, typically on the order of about 50 to about 500 micrometers, and it is filled with the TIF. The commutator comprises a thermally conductive core, thermally insulating portions, and one or more permanent magnets. The permanent magnet in each commutator is arranged to have its magnetization vector generally parallel to the commutator axis of rotational symmetry. The commutators are clocked about their common axis so that their permanent magnets are placed at the same azimuthal position and their magnetization vectors at that position are pointing in the same direction. In particular, the magnets are arranged so that an MCE disk rotating between adjacent commutators would be cyclically exposed to a sequence of relatively low magnetic field, increasing magnetic field, strong magnetic field, and decreasing magnetic field. For example, a given portion of an MCE disk may be immersed a stronger magnetic field when it is between the magnets, and it may be immersed a weaker magnetic field when it is away from the magnets.

For the purposes of this disclosure, the term "strong magnetic field" is defined as a magnetic field having an absolute value of magnetic flux density of at least 0.3 Tesla (3,000 Gauss), and the term "weak magnetic field" is defined as a magnetic field having an absolute value of magnetic flux density of at least 0.1 Tesla (1,000 Gauss) lower than the "strong magnetic field" flux density. In particular, the range of weak magnetic field may include magnetic flux density of essentially zero (0) Tesla (i.e., no field).

In operation, the shaft is arranged to rotate about its axis, thus rotating the MCE disks between the stationary commutators. Rotary motion may cause the TIF layer in the gaps between adjacent MCE disks and commutator to flow in a regime known as a shear flow and also known as a Couette flow. Rotary motion may cyclically expose a given portion of an MCE disk to a sequence of relatively low magnetic field, increasing magnetic field, strong magnetic field, and decreasing magnetic field. As a result, a given portion of an MCE disk may cyclically undergo relative warming and relative cooling due to MCE.

In a single stage MCR in accordance with the subject invention, an MCE disk has a first planar surface adjacent to a first heat commutator with a first small axial gap therebetween and a second planar surface adjacent to a second heat commutator with a second small axial gap therebetween. Said first gap and said second gap are each filled with a suitable TIF. The thermally insulating portion of the first commutator is arranged to be in a contact via TIF with a portion of the MCE disk immersed in an increasing magnetic field, strong magnetic field, and decreasing magnetic field. The thermally conductive core of the first commutator is arranged to be in a good thermal contact by means of TIF with a portion of the MCE disk immersed a weak magnetic field. Note that the terms "by means of" and "via" may be used interchangeably in this disclosure. The thermally conductive core of the second commutator is arranged to be adjacent to and in a good thermal contact via TIF with a portion of the MCE disk immersed in a strong magnetic field. The thermally insulating portion of the second commutator is arranged to be adjacent to and in a contact with a portion of the MCE disk immersed in a decreasing magnetic field, weak magnetic field, and increasing magnetic field. As a result, the first commutator may be in a good thermal contact with a cooler portion (or portions) of the MCE disk while the second commutator may be in a good thermal contact with a warmer portion (or portions) of the MCE disk. Hence the rotation of the MCE disk causes the first commutator to become cooler and the second commutator to become warmer. By connecting the thermally conductive core of the first commutator to a heat load (a heat reservoir at a lower temperature) and the thermally conductive core of the second commutator to a heat sink (a heat reservoir at a higher temperature), the MCR may pump heat from the heat load to the heat sink. Alternative commutator uses one on more heat pipes instead of the thermally conductive core for heat transport.

In a multiple stage MCR in accordance with the subject invention, heat may be transported from one adjacent MCE disk to another through a shared commutator located between them. In particular, the thermally conducting core of the shared commutator is arranged to be in a good thermal contact via TIF with a portion of a lower stage (generally cooler) MCE disk immersed in a strong magnetic field and simultaneously in a good thermal contact via TIF with a portion of an adjacent higher stage (generally warmer) MCE disk immersed in a weak magnetic field.

The thermal interface fluid (TIF) is a key material for facilitating efficient heat transfer in the MCR of the subject invention. For the purpose of this disclosure, TIF may be a liquid or a paste. Preferably, suitable TIF has a good thermal conductivity, surface wetting capability, lubrication properties, low melting point, acceptably low viscosity, low or no toxicity, and low cost. The inventor has determined that TIF should preferably have a thermal conductivity of at least as 1 W/m-degree K and most preferably at least 3 W/m-degree K. In some embodiments of the invention the TIF may be a liquid metal. Suitable liquid metal may be an alloy of gallium (Ga) such as a non-toxic eutectic ternary alloy known as galinstan and disclosed in the U.S. Pat. No. 5,800,060. Galinstan (68.5% gallium, 21.5% indium, and 10% tin) is reported to have thermal conductivity of about 16 W/m-degree K (about 27 times higher than water), a melting point of minus 19 degrees Centigrade, low viscosity, and excellent wetting properties. Brandeburg et al. in the U.S. Pat. No. 7,726,972 discloses a quaternary gallium alloy having a melting point of minus 36 degrees Centigrade, which may be also suitable for use with the subject invention. Other suitable gallium alloys may include those disclosed in the U.S. Pat. No. 5,792,236.

In other embodiments of the invention the TIF may also comprise a fluid containing nanometer-sized particles (nanoparticles) also known as nanofluid. Nanofluids are engineered colloidal suspensions of nanoparticles in a base fluid. The nanoparticles used in nanofluids may be typically made of metals, oxides, carbides, carbon, graphite, graphene, graphite nanotubes, or carbon nanotubes. Common base fluids may include water, alcohol, and ethylene glycol. Nanofluids may exhibit enhanced thermal conductivity and enhanced convective heat transfer coefficient compared to the base fluid alone. In yet other embodiments of the invention the TIF may not be strictly a fluid but rather a paste comprising mainly of micro-scale and/or nano-scale particles made of high thermal conductivity materials such as silver, copper, or graphite in suitable base liquid or paste.

Yet another embodiment of the MCR in accordance with the subject invention use heat commutators each having one or more internal passages. Each passage is arranged to fluidly connect a first MCE material exposed to high magnetic field with a second MCE material exposed to low magnetic field. The passage are filled with a suitable working fluid and arranged to operate as a heat pipe: evaporating the working fluid liquid from the surface of the first MCE material exposed to a high magnetic field and condensing the working fluid vapor on a second MCE material exposed to a low magnetic field. Liquid condensate may be returned back to the evaporator surface by gravity, a wick, or a pump.

The subject invention may be also used in reverse mode as a thermal engine converting heat into mechanical energy. In this mode heat is flowed through the apparatus of the subject invention in a direction opposite to that used in the refrigeration mode.

Accordingly, it is an object of the present invention to provide an MCR that is relatively simple and robust alternative to traditional vapor-compression cycle refrigeration systems, while attaining comparable or even higher thermodynamic efficiency.

It is another object of the invention to provide an MCR for general refrigeration and air conditioning while improving energy efficiency and reducing emissions of pollutants and greenhouse gases.

It is yet another object of the invention to provide an MCR having one or more stages to achieve commercially useful temperature differentials.

It is still another object of the subject invention to provide an MCR having low mechanical vibrations, compact size, and lightweight coupled with a thermodynamic efficiency exceeding that of thermo-electric coolers.

It is a further object of the subject invention to provide means for efficient switching and transfer of heat to and from an MCE material.

It is a still further object of the subject invention to provide means for converting low-level heat into mechanical energy.

These and other objects of the present invention will become apparent upon a reading of the following specification and claims.

BRIEF DESCRIPTION OF THE DRAWINGS

FIG. 7A is an isometric view of the MCE disk.

FIG. 7B is a cross-sectional view 7B-7B of the MCE disk of FIG. 7A.

FIG. 9A is a cross-sectional view 9A-9A of the heat commutator of FIG. 8A.

FIG. 9B is a cross-sectional view 9B-9B of the heat commutator of FIG. 9A.

FIG. 12A is an isometric view of the permanent magnets and the yokes of the MCR of FIG. 1 with all other components removed from the view.

FIG. 12B is an isometric view of the permanent magnets and the yokes of FIG. 12A rotated 45 degrees clockwise to expose obstructed elements.

FIG. 19A is an isometric view of an alternative thermally conductive core with the reverse side facing up.

FIG. 19B is an isometric view of an alternative thermally conductive core of FIG. 19A with the reverse side facing up.

FIG. 20A is a view of an alternative MCE ring for reduced parasitic heat flow in azimuthal direction.

FIG. 20B is a cross-sectional view 20B-20B of the alternative MCE ring of FIG. 20A.

FIG. 21A is a view of another alternative MCE ring having portions made of material having high thermal conductivity.

FIG. 21B is an enlarged view of portion 21B of the another alternative MCE ring of FIG. 21A.

FIG. 21C is a cross-sectional view 21C-21C of the enlarged view of FIG. 21B.

DETAILED DESCRIPTION OF THE PREFERRED EMBODIMENTS

Figure 1:
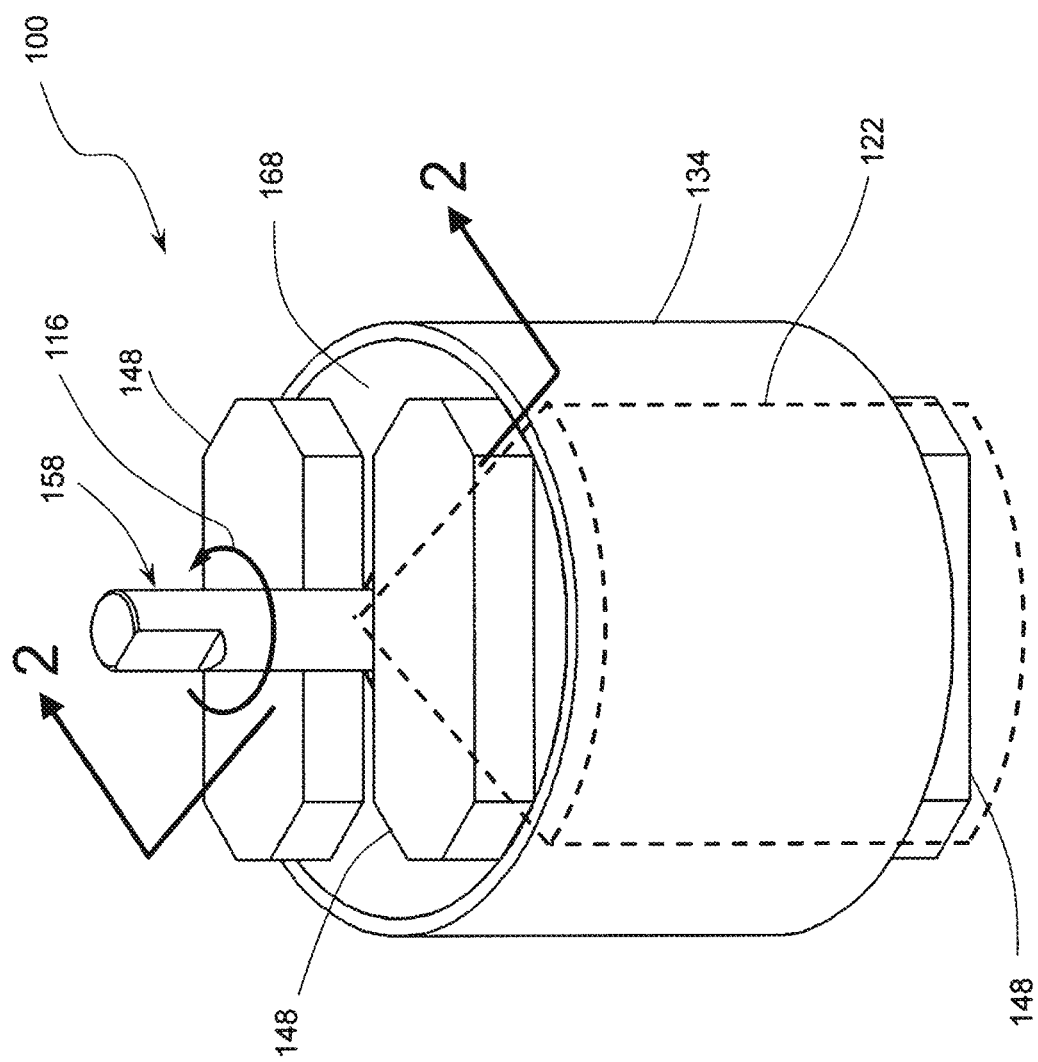
FIG. 1 is an isometric view of the MCR apparatus of the subject invention.

Selected embodiments of the present invention will now be explained with reference to drawings. In the drawings, identical components are provided with identical reference symbols in one or more of the figures. It will be apparent to those skilled in the art from this disclosure that the following descriptions of the embodiments of the present invention are merely exemplary in nature and are in no way intended to limit the invention, its application, or uses.

Referring now to FIGS. 1, 2, 3, and 4, there is shown an MCR apparatus 100 in accordance with one preferred embodiment of the present invention. Note that the isometric view of FIG. 3 having a partial section is formed from the view in FIG. 1 by removing the quadrant-like volume identified in FIG. 1 by a broken line 122. The MCR apparatus 100 has six (6) stages and it comprises six (6) MCE disks 154, seven (7) heat commutators 160, five (5) spacer disks 172, six (6) spacer rings 176, four (4) magnetic flux returns 148, end caps 168 and 170, two (2) bearings 138, a drive shaft 158, and an enclosure shell 134.

Figure 2:
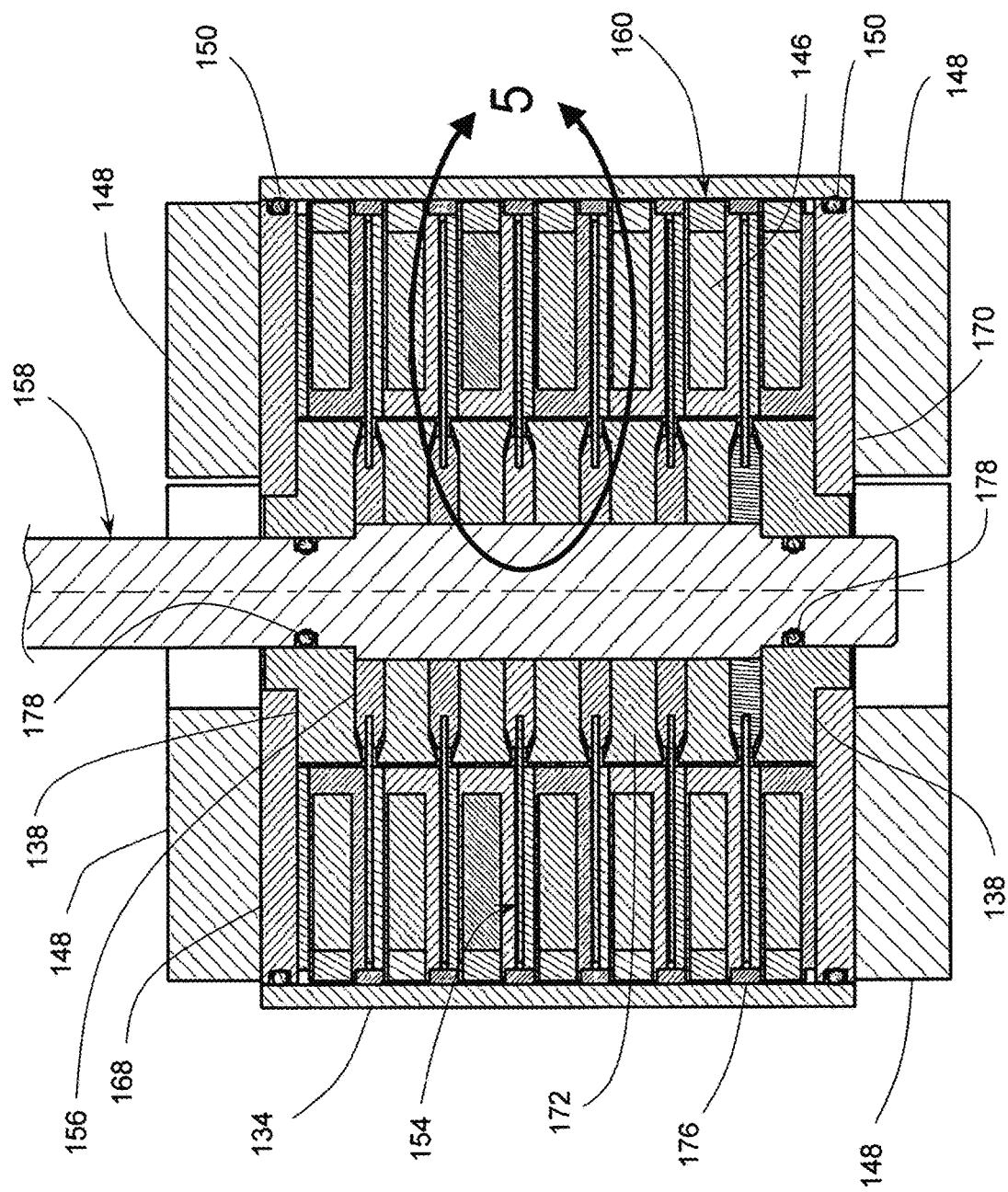
FIG. 2 is a cross-sectional view 2-2 of the MCR apparatus shown in FIG. 1.
Figure 3:
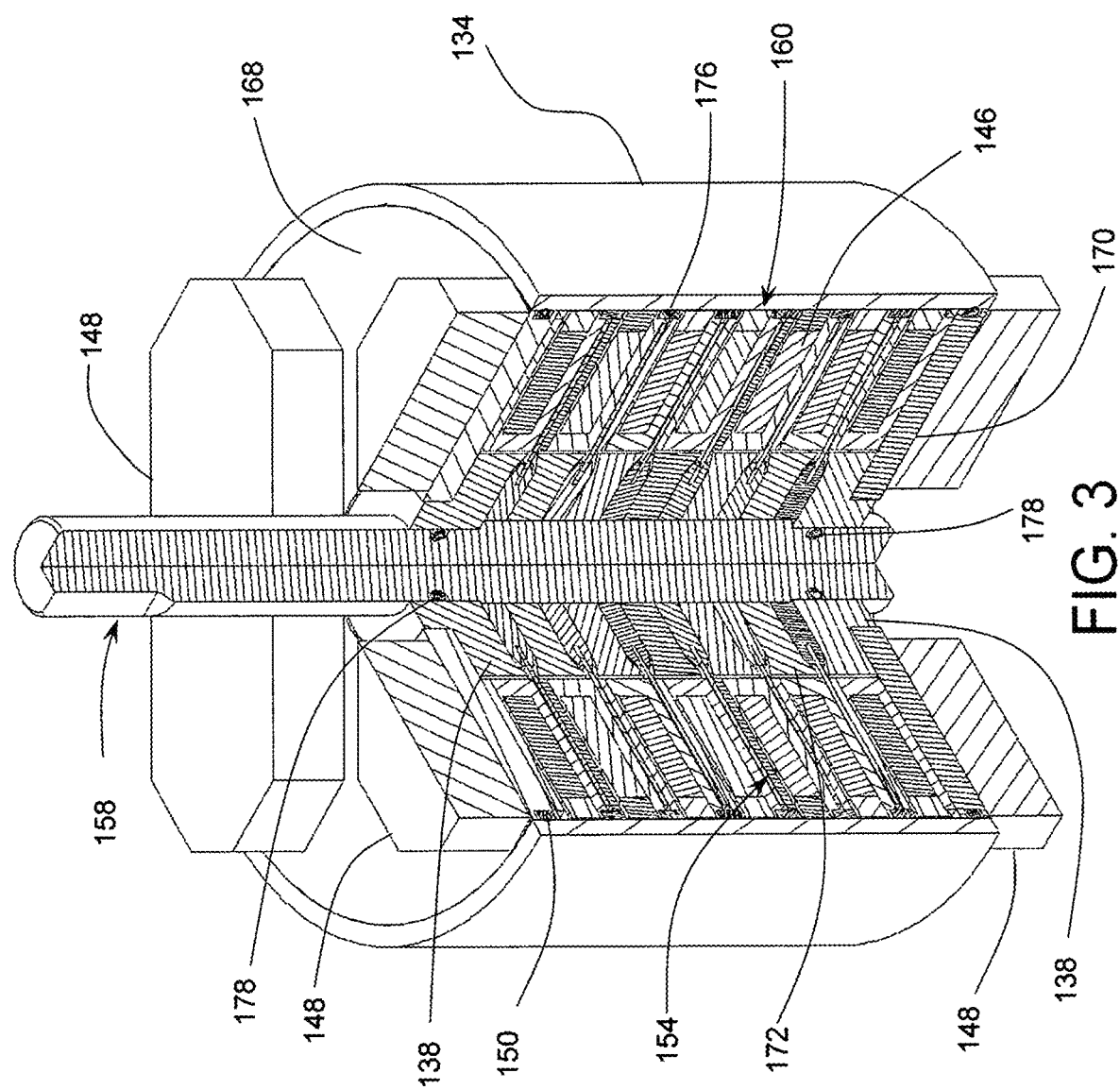
FIG. 3 is an isometric view of the MCR apparatus of FIG. 1 with a partial section exposing selected internal features.
Figure 4:
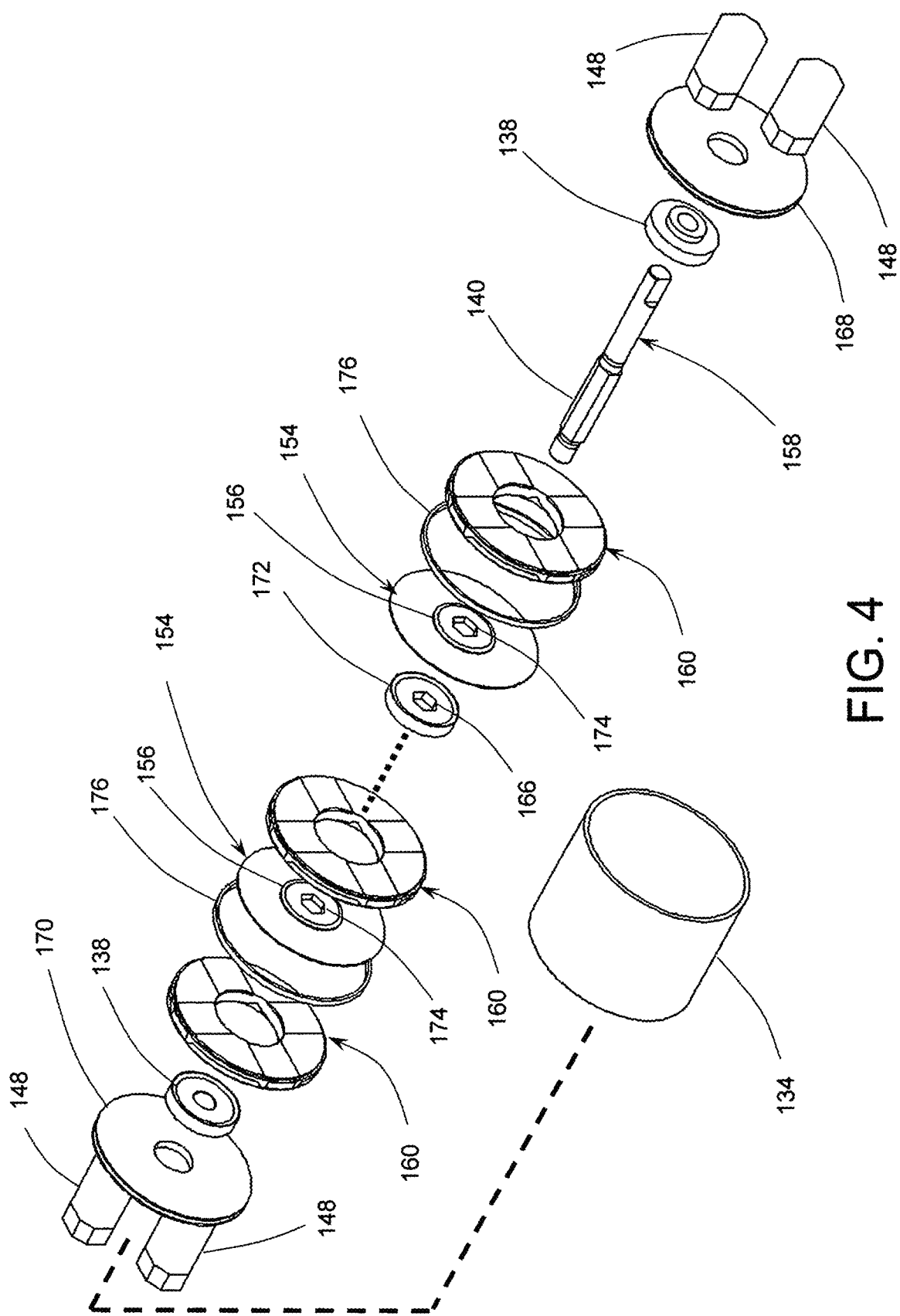
FIG. 4 is an exploded view of the SMCR apparatus of FIG. 1 omitting certain repeated components.

Referring now to FIGS. 2, 3, and 4, the enclosure 134 may be a round tubular member. The heat commutators 160 may be generally formed as annular disks (FIG. 4) arranged equally spaced on a common axis and fixed with respect to the enclosure shell 134. Spacing of the heat commutators 160 may be defined by the spacer rings 176 which may be also fixed with respect to the enclosure shell 134. The MCE disks 154 may be placed to interspace the heat commutators 160, arranged to be concentric therewith, and positioned on the drive shaft 158. In particular, the hexagonal hole 174 (FIG. 4) of the hub 156 of the MCE disk 154 may slidingly engage the hexagonal surface 140 of the drive shaft 158. Axial position of the MCE disks 154 on the drive shaft 158 may be maintained by spacer disks 172 interspacing the MCE disks 154. The hexagonal hole 166 (FIG. 4) of the spacer disk 172 may slidingly engage the hexagonal surface 140 of the drive shaft 158. The drive shaft 158 may be rotatably suspended in the bearings 138 installed in the end caps 168 and 170. O-rings 178 (FIGS. 2 and 3) may be installed on the shaft 158 to provide seals. The end caps 168 and 170 may include o-rings 150 (FIGS. 2 and 3) to provide seals to the enclosure shell 134. The heat commutators 160 comprise permanent magnets 146 (FIGS. 2 and 3). The magnetic flux returns 148 may be installed on the end caps 168 and 170 to reduce the reluctance of the magnetic circuit formed by the permanent magnets 146.

Figure 5:
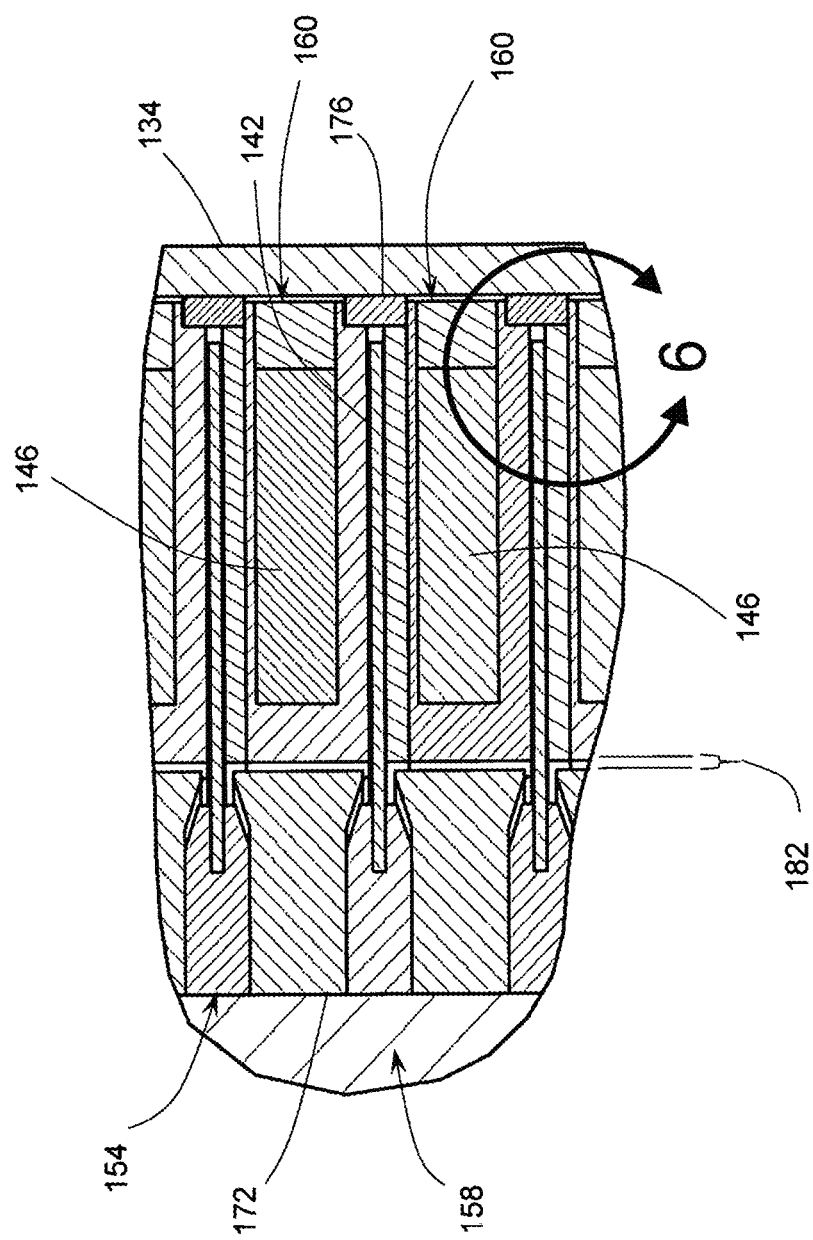
FIG. 5 is an enlarged view of portion 5 of FIG. 2.
Figure 6:
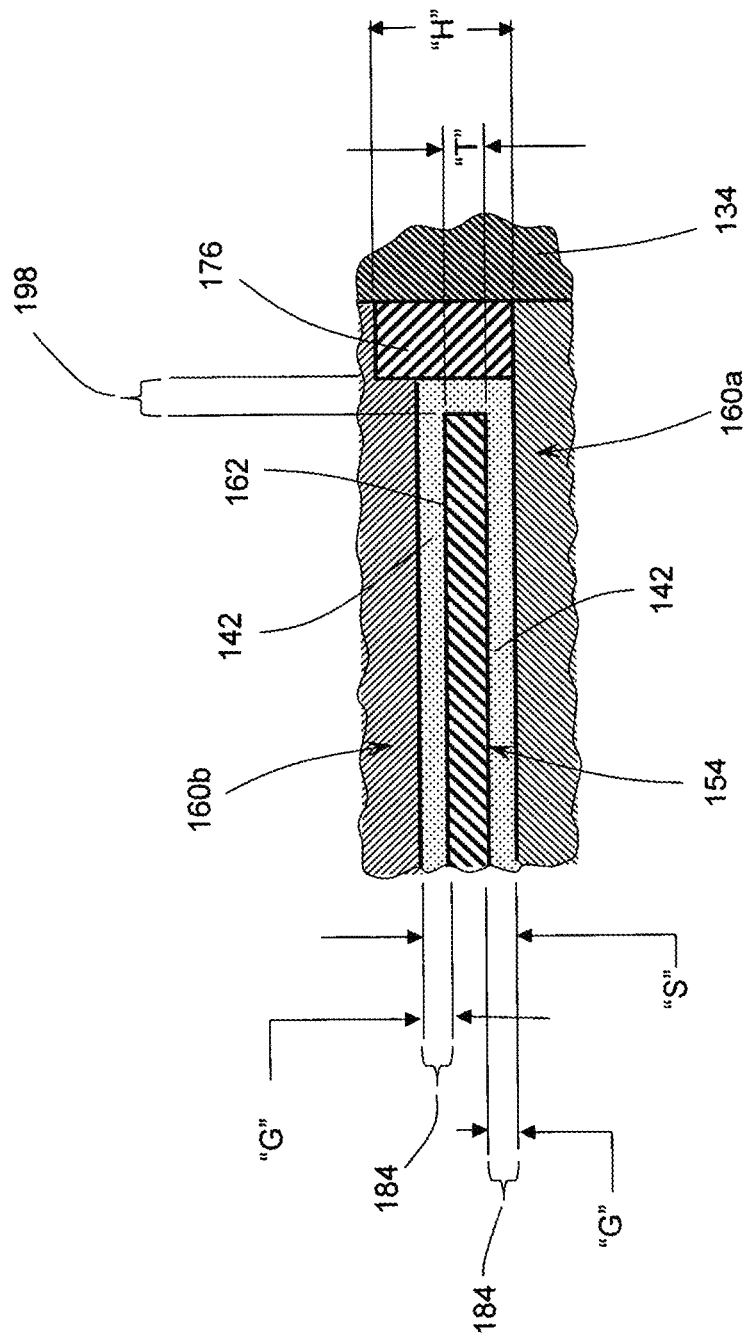
FIG. 6 is an enlarged portion 6 of FIG. 5.
Figure 8A:
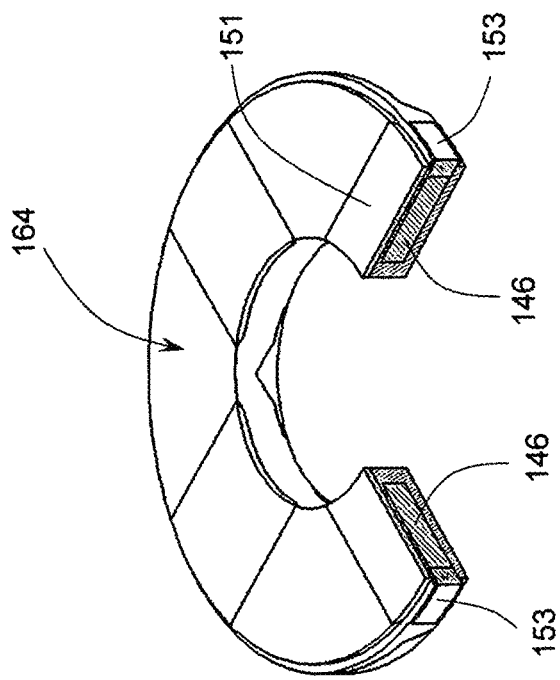
FIG. 8A is an isometric view of the heat commutator with one side facing up.
Figure 8B:
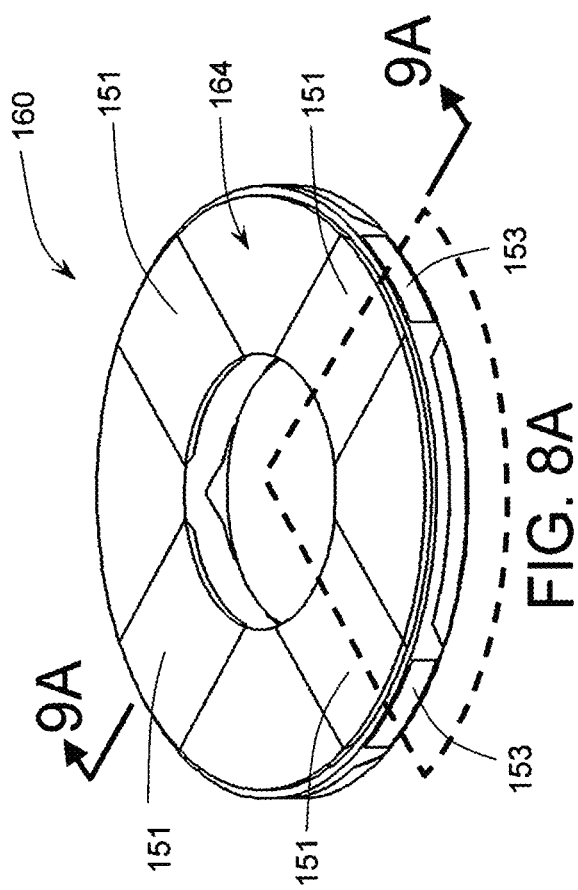
FIG. 8B is an isometric view of the heat commutator of FIG. 8A with the reverse side facing up.
Figure 8C:
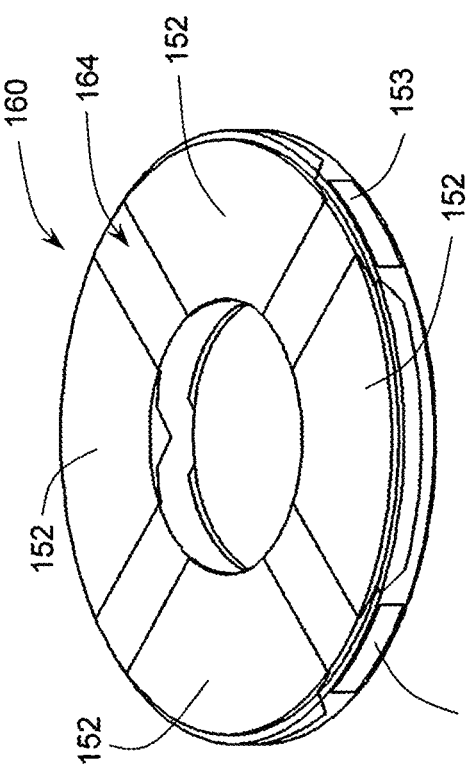
FIG. 8C is an isometric view of the commutator of FIG. 8A with a partial section exposing selected internal features.

Referring now to FIG. 5, the spacer disks 172 are sized to provide a radial clearance gap 182 between the outside diameter of the spacer disks 172 and the inside diameter of the heat commutators 160. Referring now to FIG. 6, the clearance space "S" between adjacent commutators 160a and 160a, and the thickness "T" of the MCE disk 154 are chosen so that the width "G" of axial gaps 184 between MCE disk 154 and heat commutators 160a and 160a is preferably between about 50 micrometers and about 500 micrometers (about 2 thousands of an inch and about 20 thousands of an inch). Generally, the width "G" may be adjusted by appropriately defining the height "H" of the spacer rings 176. In addition, the outside diameter of the MCE disk 154 is set to provide a radial clearance gap 198 between the perimeter of the MCE disk 154 and the spacer ring 176. Preferably, the MCE disk 154 is axially positioned about half way between the permanent magnets 146 (FIG. 6) in adjacent heat commutators 160a and 160a to balance the magnetic forces of attraction. The gaps 182, 184, and 198 should be arranged to ensure that the shaft 158 together with the MCE disks 154 and the spacer disks 172 can freely rotate on the bearings 138 while preventing the MCE disks 154 and the spacer disks 172 from rubbing on the heat commutators 160a and 160a and on the spacer rings 176. The gaps 182, 184, 198 are filled with a suitable thermal interface fluid (TIF) 142. A list of exemplary TIF that may be suitable for practicing with the MCR 100 has been provided above.

Note that choosing a small width "G" of the gap 184 may beneficially improve thermal communication between the MCE disk 154 and the heat commutators 160a and 160a, but the manufacturing tolerances of the MCR 100 may become more challenging. Conversely, choosing a large width "G" of the gap 184 may beneficially relax manufacturing tolerances of the MCR 100 at the expense of reduced thermal communication between the MCE disk 154 and the heat commutators 160a and 160a.

If the TIF 146 comprises gallium and its alloys, metal components of the MCR 100 may require protective coating to prevent corrosion. Metal components requiring anti-corrosion coating may include portions the MCE disk 154, portions of the commutators 160, and the end caps 168 and 170. Suitable protective coatings may include but they are not limited to titanium nitride (TiN) and the diamond-like coating (DLC) Titankote C11 available from Richter Precision, Inc. in East Petersburg, Pa.

The shaft 158, enclosure shell 134, spacer disks 172, spacer rings 176, and MCE disk hubs 156 (FIG. 4) are preferably made from a material having very low thermal conductivity. Such suitable materials may include, but they are not limited to, epoxies including fiberglass epoxy and graphite epoxy, glass fiber silicons, plastics including polyvinylchloride (PVC), polystyrene, polyethylene, acrylics, Teflon®, and ceramics. In addition, some of these parts (namely, the drive shaft 158) may be made hollow to further reduce their thermal conductance. Furthermore, the outer perimeter of the enclosure shell 134 may be equipped with a suitable thermally insulating jacket (not shown). Suitable thermally insulating jacket may be made from, but it is not limited to, polystyrene foam.

The bearings 138 are preferably made of made from a material having low friction with respect to the material of the shaft. Alternatively, the bearings 138 may include anti-friction (i.e., rolling element) bearing portion. The o-rings 150 and 178 may be made from a suitable elastomeric material such as buna-n, silicon rubber, Viton®, or Teflon®. The end caps 168 and 170 are preferably made of made from a material having high thermal conductivity such as, but not limited to, copper, aluminum, silicon, silicon carbide, and aluminum nitride. The magnetic flux returns 148 are preferably made from a soft magnetic material having a high magnetic saturation such as, but not limited to, mild steel, low carbon steel, silicon steel, iron, iron-cobalt-vanadium alloys, Consumet® electrical iron, and Hyperco® 50. Consumet® electrical iron and Hyperco® 50 are available from Carpenter Technology Corporation in Wyomissing, Pa.

Referring now to FIGS. 7A and 7B, the MCE disk 154 comprises an MCE ring 162 and a hub 156. The MCE ring 162 may be formed from a suitable MCE material and it may be shaped as an annular disk having an outside diameter "D", width "W", and thickness "T". Typical range for the outside diameter "D" is from about 5 centimeters to about 30 centimeters, however, an MCE ring 162 having a diameter "D" outside this range may be also practiced. Typical range for the width "W" is from about 2 centimeters to about 12 centimeters, however, an MCE ring 162 having a width "D" outside this range may be also practiced. Typical range for the thickness "T" is from about 0.5 millimeters to about 5 millimeters, however, an MCE ring 162 having a thickness "T" outside this range may be also practiced. Preferably, the MCE material of each MCE ring 162 is optimized for the anticipated operating temperature range in accordance with its placement in the MCR 100. For example, if the MCE rings 162 are made of the above noted GdSiGe alloy, the Si:Ge ratio may be adjusted so that the alloy Currie point is near (or within) the anticipated operating temperature range of the MCE ring. The hub 156 is affixed to the MCE ring 162. The hub 156 has a hexagonal hole 174 for engaging the hexagonal surface 140 of the drive shaft 158. When the hub 156 is made of thermoplastic material, it may be molded directly onto the MCE ring 162.

Figure 10C:
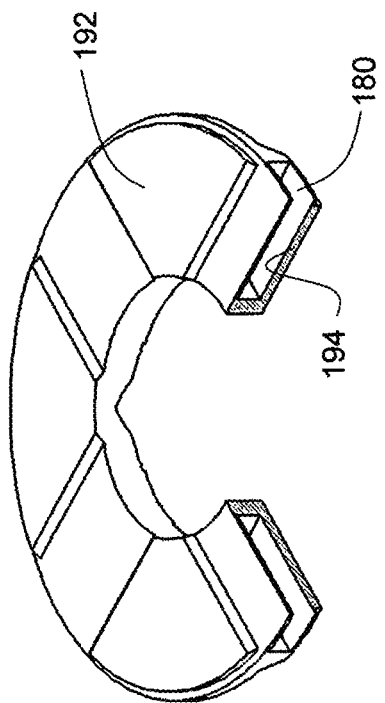
FIG. 10C is an isometric view of the thermally conductive core of FIG. 10A with a partial section exposing selected internal features.
Figure 10A:
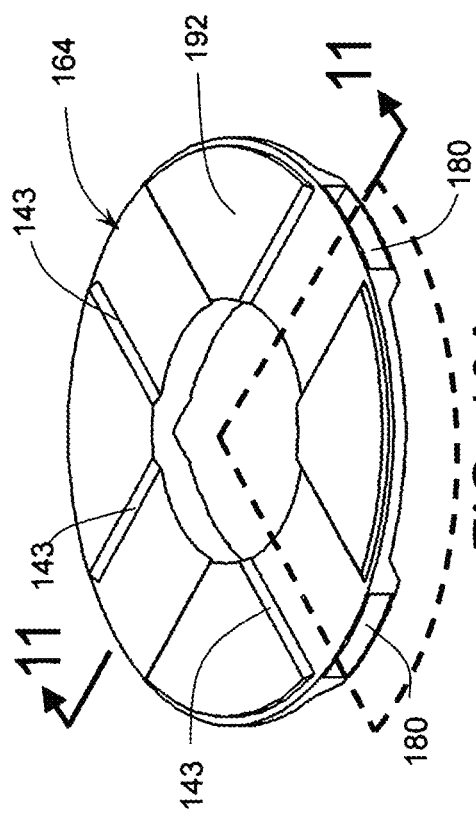
FIG. 10A is an isometric view of the thermally conductive core with one side facing up.
Figure 10B:
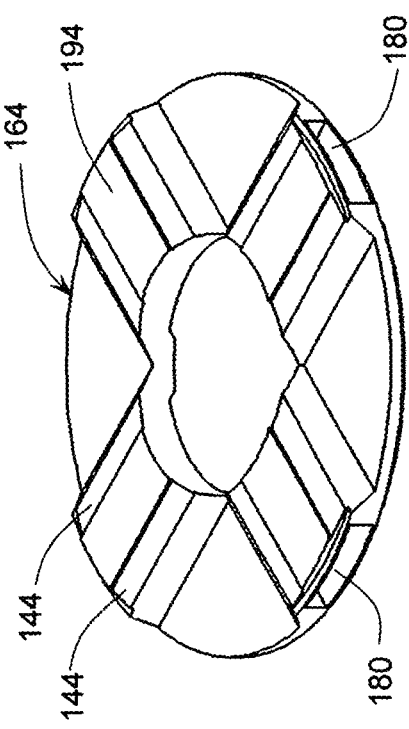
FIG. 10B is an isometric view of the thermally conductive core of FIG. 10A with the reverse side facing up.
Figure 11:
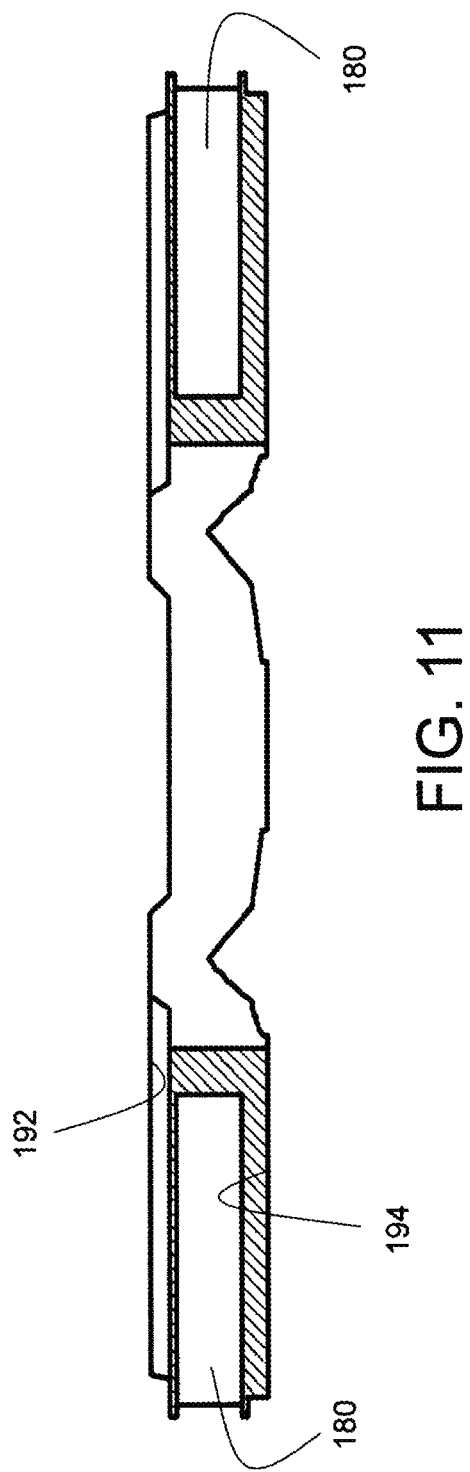
FIG. 11 is a cross-sectional view 11-11 of the commutator of FIG. 10A.

Referring now to FIGS. 8A, 8B, 8C, 9A, and 9B, the heat commutator 160 may be generally formed as an annular disk comprising a thermally conducting core 164, thermally insulating portions 151, 152, and 153, and permanent magnets 146. Note that the isometric view of FIG. 8C having a partial section is formed from the view in FIG. 8A by removing the quadrant-like volume identified in FIG. 8A by a heavy broken line. The thermally conducting core 164 shown in FIGS. 10A, 10B, 10C, and 11 may be generally formed as an annular disk-like member comprising thermal interface surfaces 192 and 194, sloped surfaces 143 and 144, and magnet pockets 180. Note that the isometric view of FIG. 10C having a partial section is formed from the view in FIG. 10A by removing the quadrant-like volume identified in FIG. 10A by a heavy broken line. The thermally conducting core 164 is preferably constructed from a material having high thermal conductivity. Materials suitable for construction of the thermally conducting core 164 may include, but they are not limited to, copper, aluminum, silicon, aluminum nitride, and silicon carbide. The thermally conducting core 164 may be fabricated as one piece using casting, conventional machining, molding, or electro-discharge machining (EDM), or any combination thereof, or by any other suitable technique. The insulating portions 151, 152, and 153 (FIGS. 8A, 8B, 8C, 9A, and 9B,) of the heat commutator 160 are preferably made from a material having a low thermal conductivity and/or being substantially thermally insulating. When the insulating portions 151, 152, and 153 are made of a suitable thermoplastic material, they may be molded directly onto the thermally conductive core 164. The permanent magnets 146 may be installed in the pockets 180 within the thermally conducting core 164 (see FIGS. 10A, 10B, 10C, and 11) prior to installation of the insulating portion 153. Preferably, the insulating portions 153 seal the magnets 146 in their pockets 180 to prevent their exposure to the TIF. The permanent magnets 146 may be of the rare earth type such as a neodymium-iron-boron (NdFeB) composition having a remanent magnetic flux density in excess of 1.4 Tesla, but other types of permanent magnets may be also practiced with the subject invention. Preferably, the permanent magnets 146 are arranged to fit tightly into the pockets 180 to provide good thermal communication therebetween. The magnetization vectors 186 of the permanent magnets 146 are preferably arranged to be perpendicular to the thermal interface surfaces 194 of the thermally conducting core 164 (FIG. 10B). The direction of the magnetization vectors 186 is generally shown in FIG. 9B where the symbol "●" represents a magnetization vector being normal to the drawing sheet and pointing out toward the viewer, and the symbol "⊗" represents a magnetization vector being normal to the drawing sheet and pointing in away from the viewer.

When the commutators 160 are installed in the MCR 100 as shown in FIGS. 2, 3, and 4, the magnetization vectors of their permanent magnets 146 at each azimuthal position are aligned in the same direction. As a result, the permanent magnets 146 and the four (4) flux returns 148 form a magnetic structure 126 shown in FIGS. 12A and 12B. The magnets 146 in the magnetic structure 126 are arranged in four stacks 120a, 120b, 120c, and 120d. The magnets in each stack have their magnetization vectors 186 aligned in the same direction. Furthermore, the magnetization vectors 186 of the permanent magnets 146 in the stacks 120a and 120c are pointing in the same direction. The magnetization vectors 186 of the permanent magnets 146 in the stacks 120b and 120d are pointing in the same direction, which is opposite to the direction of magnetization vectors of the stacks 120a and 120c. Two (2) magnetic flux returns 148 are provided to close the magnetic circuit 190 (FIG. 12A) formed by the magnet stacks 120a and 120c. Another two (2) magnetic flux returns 148 are provided to close the magnetic circuit formed by the magnet stacks 120b and 120d.

Figure 13B:
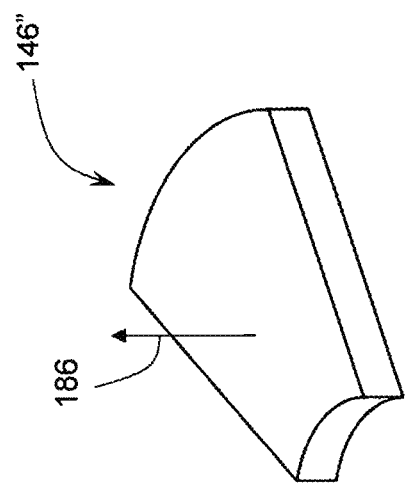
FIG. 13B is an isometric view of another alternative permanent magnet.
Figure 13A:
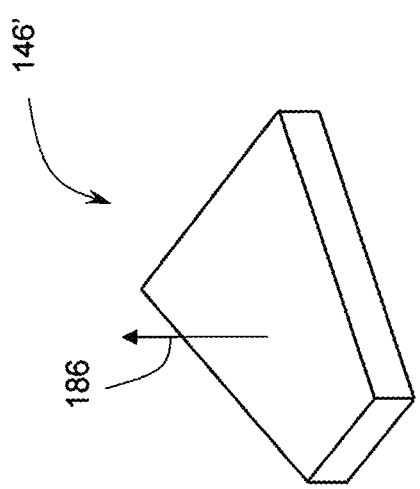
FIG. 13A is an isometric view of an alternative permanent magnet.

The permanent magnets 146 shown in FIGS. 12A and 12B are formed to a rectilinear shape. However, other magnet shapes may be also used with the subject invention. FIGS. 13A and B respectively show examples of alternative permanent magnet shapes 146' and 146" that may be used with the subject invention.

Figure 14:
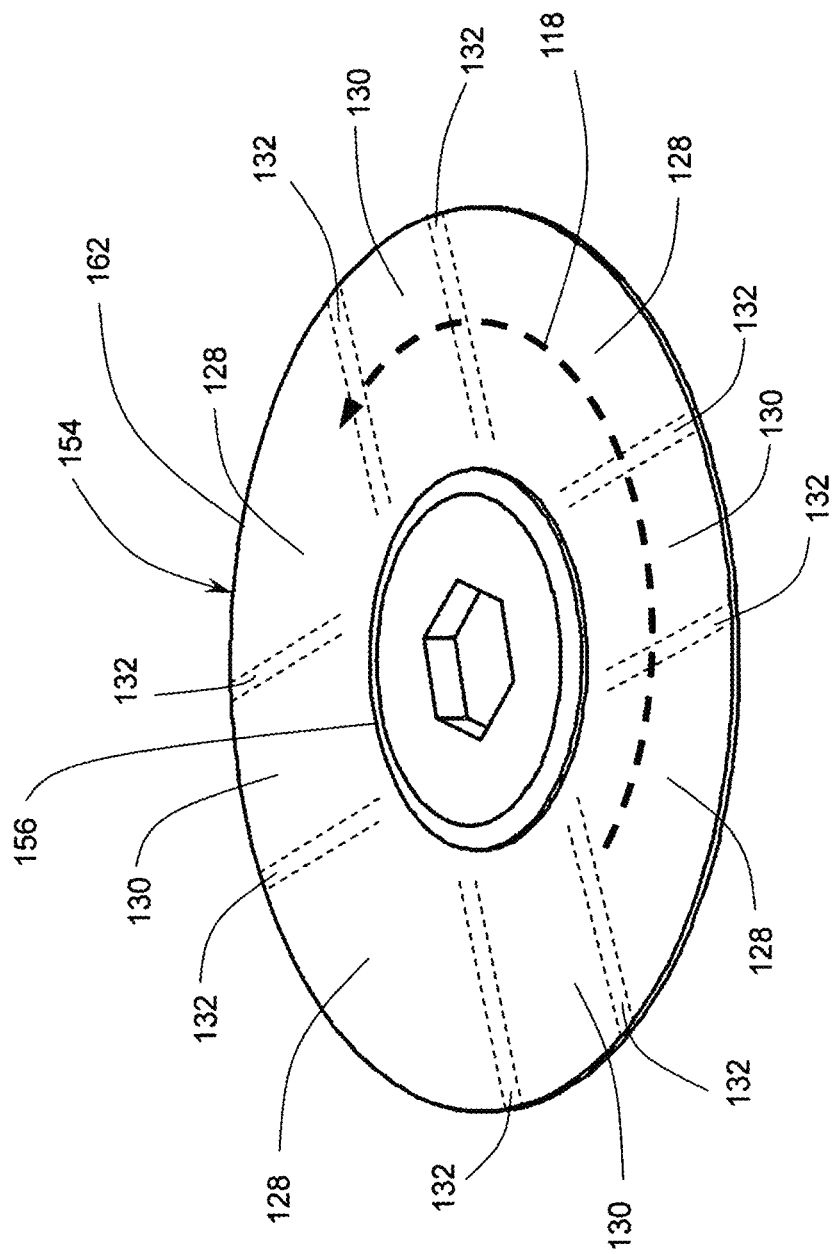
FIG. 14 is an isometric view of the MCE disk of FIG. 7A indicating regions exposed to specific magnetic field strength.
Figure 15:
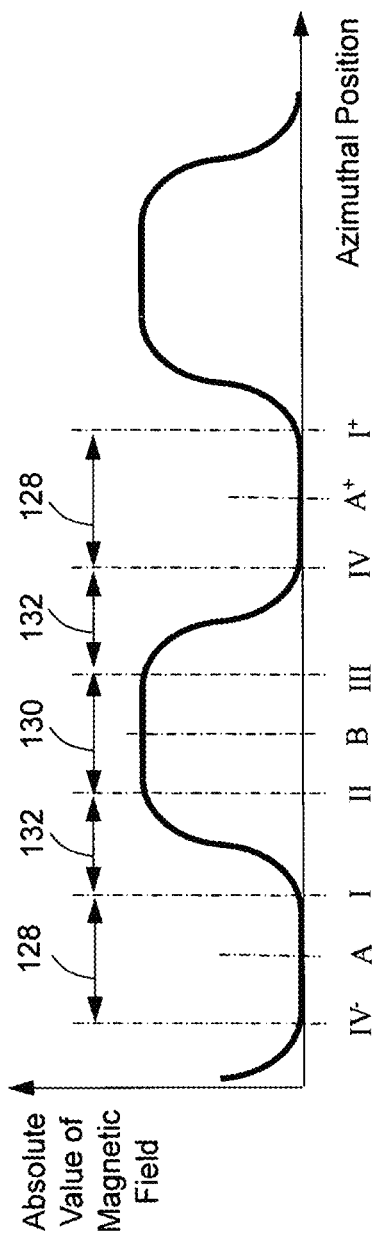
FIG. 15 is a plot of absolute magnetic field flux density along the heavy broken curve 118 of FIG. 14.
Figure 16:
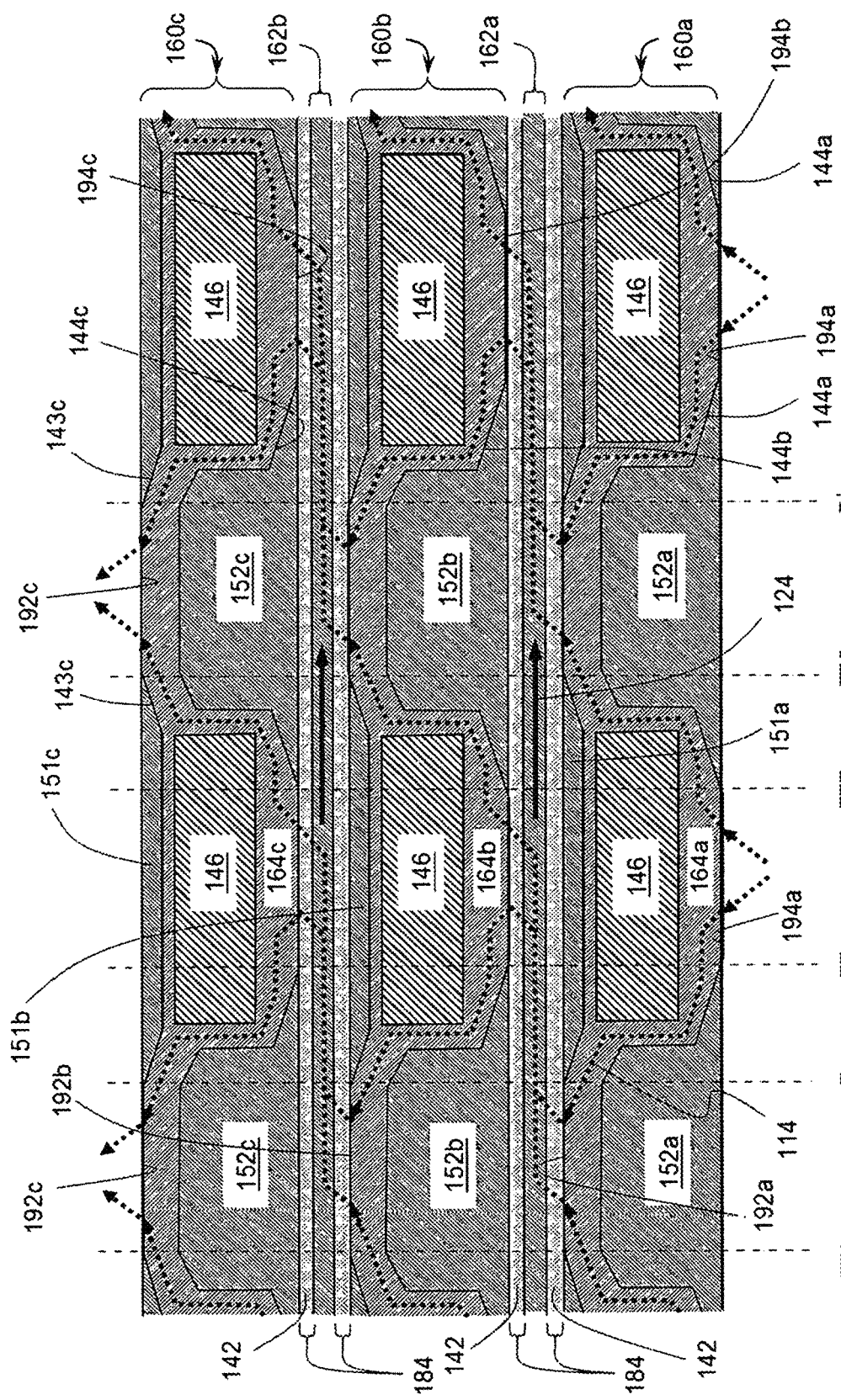
FIG. 16 is a cross-sectional view of a portion of the MCR of FIG. 1.

An MCE disk 154 installed in the MCR 100 will be exposed magnetic field spatially varying from weak to strong. FIG. 14 is an approximate map of the magnetic field in the MCE disk 154 identifying regions 130 of generally constant and strong magnetic field, regions 128 of generally constant and weak magnetic field, and regions 132 of increasing or decreasing magnetic field having strong gradient. FIG. 15 shows a typical profile of absolute magnetic field value along an azimuthal path 118 in the MCE ring 162 of FIG. 14. Azimuthal positions I, II, III, and IV generally define boundaries between regions of specific magnetic field strength. In particular, the segment IV⁻-I is generally a region of a weak magnetic field, the segment I-II is generally a region of an increasing magnetic field, the segment II-III is generally a region of a strong magnetic field, the segment III-IV is generally a region of decreasing magnetic field, and the segment IV-I⁺ is generally a region of a weak magnetic field. FIG. 16 shows an enlarged section of the MCR 100 along an azimuthal path (which may be similar to the path 118 of FIG. 14) including two MCE disks 154a and 154b, and their adjacent heat commutators 160a, 160b, and 160c. The azimuthal positions I, II, III, and IV are shown with respect to the features of the heat commutators 160a, 160b, and 160c.

In operation, the drive shaft 158 together with the MCE disks 154 and disk spacers 172 (FIG. 2) may be rotated by an externally applied torque in the direction identified by arrow 116 (FIG. 1). For example, the drive shaft may 158 may be rotated by an electric motor, hydraulic motor, air motor, an internal combustion engine, a mechanical spring, by hand, or by any other suitable means. Concurrently, the heat commutators 160, the enclosure shell 134, the spacer rings 176, the bearings 138, the end caps 168 and 170, and the magnet flux returns 148 may remain stationary. The relative motion between the MCE disks 154 and the heat commutators 160 may cause the TIF 142 in the gaps 184 (FIGS. 6 and 16) to flow in a regime known as "shear-driven flow" also known as a "Couette flow." Such a flowing condition of the TIF 142 may significantly enhance its heat transferring capability.

Figure 17:
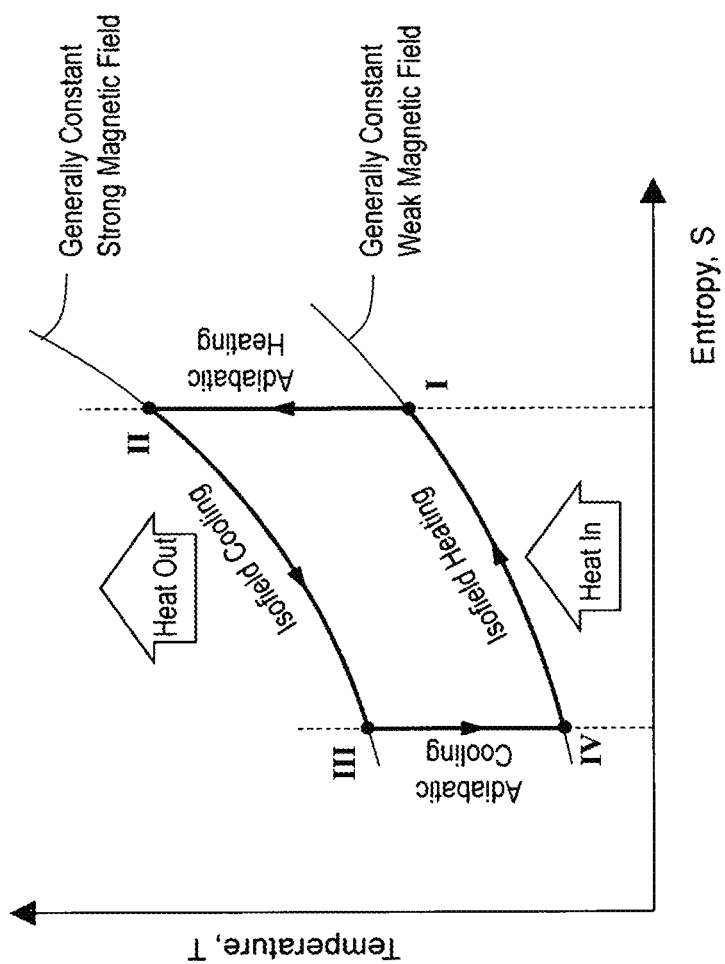
FIG. 17 is a diagram of temperature versus entropy illustrating a thermodynamic cycle of an exemplary portion of one MCE disk of FIG. 16.

Now referring to FIG. 16, rotary motion causes the MCE rings 162a and 162b to move azimuthally in the direction of the arrow 124. Thus an exemplary portion of the MCE rings 162a and 162b may repeatedly pass through the positions IV⁻, I, II, III, IV, and I⁺. In particular, the exemplary portion of the MCE ring 162a arriving at the position IV⁻ forms a good thermal communication (via TIF 142 in the gap 184) with the thermally conducting core 164a of the heat commutator 160a. While being in the segment IV⁻-I (region of substantially constant weak magnetic field), the exemplary portion of the MCE ring 162a may be in its lower temperature state and it may receive heat from the thermally conducting core 164a. In particular, heat flow is indicated by a dotted line and arrow 114. Concurrently, the exemplary portion of the MCE ring 162a is thermally insulated from the heat commutator 160b by the insulating portion 152b. Since most MCE materials may have a limited thermal conductivity (typically around 10 Watts/meter-degrees Kelvin or less), azimuthal conduction of heat in the MCE ring 162a may be rather slow compared to the speed of azimuthal motion indicated by the arrow 124. Hence, the temperature of the exemplary portion of the MCE ring 162a at the position I may be higher than its temperature at the position IV⁻. The associated thermodynamic process is shown in FIG. 17, which (in an idealized theoretical sense) plots the temperature of the exemplary portion of the MCE ring 162a against its entropy. In particular, the thermodynamic process of the exemplary portion of the MCE ring 162a in the segment IV-I, which is labeled "isofield heating" (because it occurs at a substantially constant magnetic field) includes heat input (from the thermally conducting core 164a) accompanied by the increases in each the temperature and the entropy the exemplary portion.

Referring now back to FIG. 16, the exemplary portion of the MCE ring 162a may now progress to the segment I-II (a region of increasing magnetic field) where it may experience a temperature rise due to the MCE. Concurrently, the exemplary portion of the MCE ring 162a is being thermally insulated from the thermally conducting core 164a by the insulating portion 151a and from the thermally conducting core 164b by the insulating portion 152b. The thermodynamic process of the exemplary portion of the MCE ring 162a in the segment I-II is labeled "adiabatic heating" in FIG. 17 because the heating occurs under substantially thermally insulated conditions. Referring now back to FIG. 16, the exemplary portion of the MCE ring 162a may now progress to the segment II-III (a region of substantially constant strong magnetic field) where it may be in a good thermal communication (via TIF 142 in the gap 184) with the thermally conducting core 164b of the heat commutator 160b while being thermally insulated from the thermally conducting core 164a by the insulating portion 151a. Note, that at least a portion the heat acquired by the exemplary portion of the MCE ring 162a in the segment IV⁻-I has been substantially transported to the segment II-III by the motion of the MCE ring 162a. Heat transport is indicated by the dotted line 114. A portion of the heat stored in the exemplary portion of the MCE ring 162a may be now transferred via TIF 142 into the thermally conducting core 164b of the heat commutator 160b. The thermodynamic process of the exemplary portion of the MCE ring 162a in the segment II-III is labeled "isofield cooling" because it occurs at a substantially constant (and strong) magnetic field. This process includes heat loss (to the heat commutator 160b) accompanied by decreases in each the temperature and the entropy of the exemplary portion of the MCE ring 162a.

Referring now back to FIG. 16, the exemplary portion of the MCE ring 162a may now progress to the segment III-IV (a region of decreasing magnetic field) where it may experience a temperature decrease due to the MCE. Concurrently, the exemplary portion of the MCE ring 162a is being thermally insulated from thermally conducting core 164a of the heat commutator 160a by the insulating portion 151a, and from thermally conducting core 164b of the heat commutator 160b by the insulating portion 152b. The thermodynamic process of the exemplary portion of the MCE ring 162a in the segment III-IV is labeled "adiabatic cooling" in FIG. 17 because the cooling occurs under substantially thermally insulated conditions. As the exemplary portion of the MCE ring 162a arrives at the position IV, its theoretical thermodynamic state may be same as it was at the position IV⁻, thus completing a closed thermodynamic cycle. Thus the, position IV marks both the end of the above described cycle and the beginning of a new cycle. As the exemplary portion of the MCE ring 162a progresses though the segment IV-I⁺ it acquires heat from the thermally conducting core 164a and so on. Because the MCE ring 162a has to pass through four (4) peaks and four (4) valleys in the absolute magnetic field, it will experience four thermodynamic cycles per rotation. Each such a cycle may remove heat from the thermally conducting core 164a of heat commutator 160a and "pump" it to the thermally conducting core 164b of the heat commutator 160b. Thus, the net effect of the rotation of the MCE ring 162a is the removal of heat from the heat commutator 160a and "pumping" it to the heat commutator 160b. Concurrently, a similar process takes place on the MCE ring 162b, namely heat removal from the heat commutator 160b and "pumping" it to the heat commutator 160c. The thermodynamic cycle of the MCE ring 162b may be similar to that shown in FIG. 17, but it may generally occur at an elevated temperature. Each MCE disk 154 (with its MCE ring 162) represents a stage in the MCR 100, which is shown in FIGS. 2 and 3 to have six (6) stages. With additional MCE disks 154 and commutators 160 being added, an MCR with arbitrary number of stages may be constructed to attain a desirable temperature differential. Similarly, the number of peaks and valleys in the absolute magnetic field experienced by the MCE disks 154 in a single rotation may be increased or decreased.

Referring now to FIG. 2, the end cap 170 is arranged to be in a good thermal communication with its adjacent heat commutator, and the end cap 168 is arranged to be in a good thermal communication with its adjacent heat commutator. Operation of the MCR 100 may cause the end cap 170 to become colder and the end cap 168 to become warmer. The end cap 170 may be placed in a thermal communication with an article or a substance to be cooled, while the end cap 168 may be placed in a thermal communication with a suitable heat sink. The number of MCE disks 154 and heat commutators 160 in the MCR 100 may be set in accordance with a desirable temperature differential between the "hot" end cap 168 and the "cold" end cap 170. The diameter of the MCE disk 154 may be increased to increase the refrigeration power. A larger MCE disk diameter may also make it possible to increase the number of peaks and valleys in the absolute magnetic field experienced by the MCE disks 154 in a single rotation to further increase the refrigeration power. Using stronger magnets may also substantially increase the refrigeration power. Varying the speed of rotation may be also used to vary the refrigeration power, however, excessively slow speed of rotation may increase parasitic losses due to heat conduction in azimuthal direction inside the MCE ring 162, while excessively fast speed of rotation may limit the amount of heat that may be conductively transferred between the interior and the surface of the MCE ring 162. The latter may be due to the already noted rather limited thermal conductivity of the MCE material of the MCE ring 162. Depending on a specific construction, the speed at which the MCR drive shaft 158 may rotate for optimum performance may be in the range of several revolutions per minute (RPM) to several tens (10's) of RPM. As a result, the MCR of the subject invention may generate substantially less acoustic noise in the audible range than a comparable vapor compression cycle refrigerator, which may have a compressor operating at around 1800 RPM.

For example, if the MCR of the subject invention is used in a refrigerator or a freezer application, the "cold" end cap 170 may be placed in a good thermal communication with an inside wall of a refrigerator/freezer and/or with air inside the refrigerator/freezer, while the "hot" end cap 168 may be placed in a good thermal communication with a suitable heat exchanger cooled by ambient air.

As another example, if the MCR of the subject invention is used in an air conditioning application, the "cold" end cap 170 may be placed in a good thermal communication with a heat exchanger thermally contacting the ambient inside (indoors) air, while the "hot" end cap 168 may be placed in a good thermal communication with a suitable heat exchanger cooled by ambient outside air. Alternatively, if the MCR of the subject invention is used in a heat pump application, the "cold" end cap 170 may be placed in a good thermal communication with a heat exchanger thermally contacting the ambient outside air, while the "hot" end cap 168 may be placed in a good thermal communication with a suitable heat exchanger thermally contacting the ambient inside (indoors) air.

As yet another example, if the MCR of the subject invention is used in electronics cooling application, the "cold" end cap 170 may be placed in a good thermal communication with the electronics to be cooled, while the "hot" end cap 168 may be placed in a thermal communication with a suitable heat exchanger cooled by ambient outside air. If the MCR of the subject invention is used to cool electronics on a spacecraft, the "hot" end cap 168 may be placed in a good thermal communication with a suitable heat radiator.

In stationary applications, such as air conditioning of buildings, the drive shaft 158 may be rotated by an electric motor, preferably through a reduction gear box. In mobile applications such as automotive vehicles, the drive shaft 158 may be rotated directly by the propulsion engine or motor. Furthermore, in some vehicular applications the drive shaft 158 may be rotated at least intermittently by mechanical energy recovered during vehicle deceleration. Since the MCR of the subject invention may offer higher efficiency over a conventional vapor compression cycle, it may be advantageously used for cabin air conditioning and comfort heating in electric vehicles and hybrid electric vehicles. Because cabin air conditioning and comfort heating in such vehicles competes with propulsion motors for electric energy for batteries, energy efficient air conditioning and heating is very important.

Figure 18:
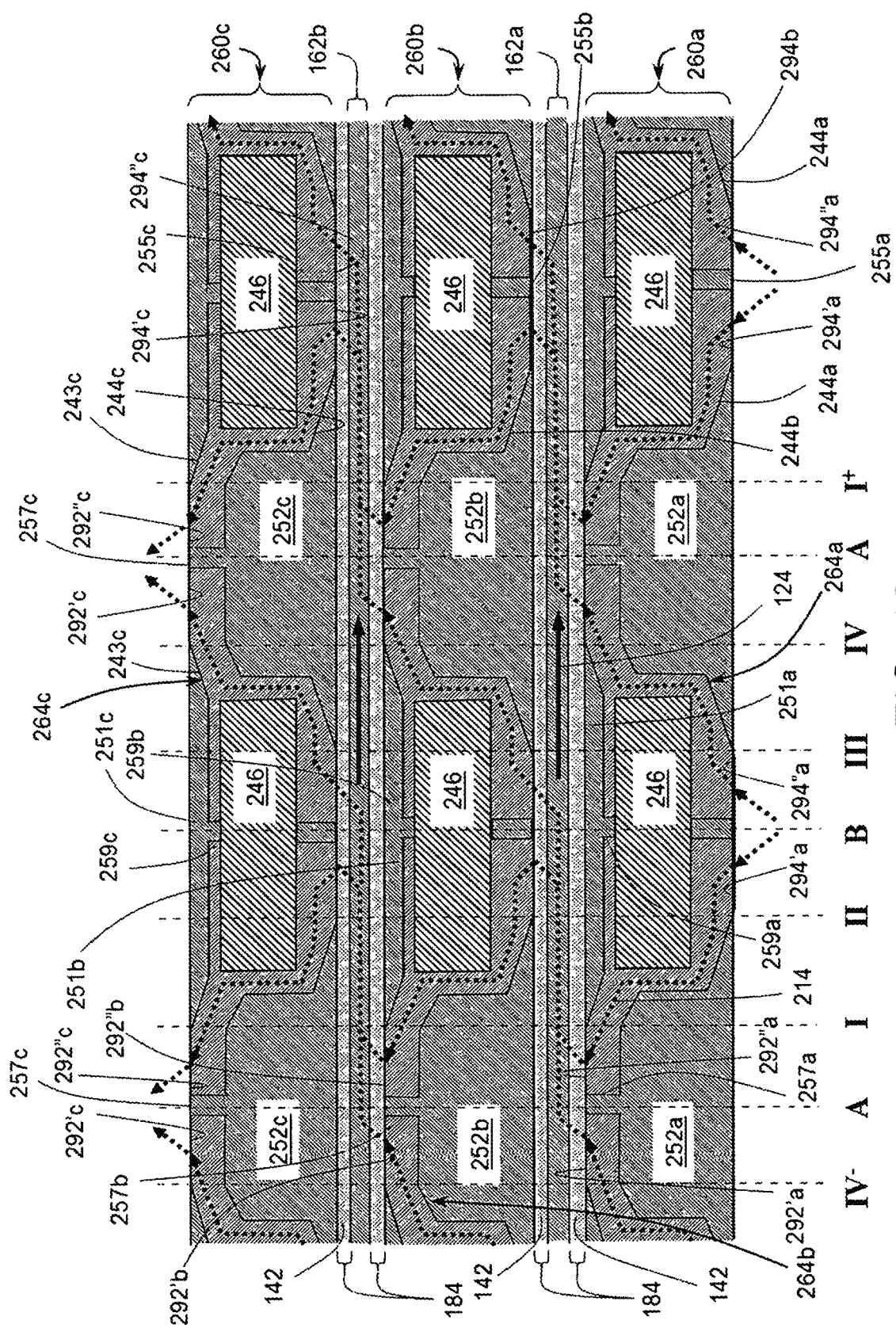
FIG. 18 is a cross-sectional view of a portion of the MCR of FIG. 1 showing alternative heat commutators.

Referring now to FIG. 18, there is shown an azimuthal section (similar to the section shown in FIG. 16) through a portion of an MCR of the subject invention showing an alternative heat commutators 260 having alternative thermally conducting cores 264 divided by insulators 257 at azimuthal position "A" and by insulators 255 and 259 at azimuthal position "B". The alternative thermally conducting core 264 may be formed by radially splitting the heat transfer surfaces 192 and 194 of the thermally conducting core 164 (FIGS. 10A and 10B) into heat transfer surfaces 292' and 292", and 294' and 294" respectively as indicated by heavy broken lines 212 in FIGS. 19A and 19B. In particular, the alternative thermally conducting core 264 may be formed as several separate portions rather than being monolithic.

The alternative thermally conducting core 264 allows for its separate portions to operate at different temperatures. For example, the alternative thermally conducting core 264 allows for a dedicated thermal communication between the portion of the MCE ring 162a in the segment II-B with the portion of the MCE ring 162b in the segment A-I without being in a direct thermal communication via the thermally conducting core material with the portion of the MCE ring 162a in the segment B-III. As another example, the alternative thermally conducting core 264 allows, for a dedicated thermal communication between the portion of the MCE ring 162a in the segment B-III with the portion of the MCE ring 162b in the segment IV-A without being in a direct thermal communication via the thermally conducting core material with the portion of the MCE ring 162b in the segment A-I⁺.

The preferential path for transporting the heat in the MCR of the subject invention are shown as dotted lines and arrows 214 in FIG. 18. Whereas a monolithic thermally conducting core 164 is substantially isothermal during the operation of the MCR of the subject invention, portions the alternative thermally conducting core 264 may operate at temperatures different from each other. The permanent magnets 246 may be thermally insulated from portions of the thermally conducting core 264. MCR of the subject invention using alternative thermally conducting core 264 may have a significant performance advantage over the MCR of the subject invention using a monolithic thermally conducting core 164.

It has been noted above that heat conduction within the MCE ring 162 in the azimuthal direction may be undesirable as it may reduce the efficiency of the MCR 100. FIG. 20A shows an alternative MCE ring 362 having radial slots 369 for restricting parasitic flow of heat in azimuthal direction. The slots 369 may be empty or filled with a suitable thermally insulating material. FIG. 20B is a cross-sectional view of the MCE ring 362 showing that the slots 369 may penetrate through the full thickness of the MCE ring material. An alternative slots (not shown) may not be necessarily radial and/or may not necessarily penetrate through the full thickness of the MCE ring material.

It has been noted above that MCE materials may have only a limited thermal conductivity in the range of about 10 Watts/meter-degree Kelvin and often lower. This makes it challenging to conduct heat to and from the interior of the MCE ring 162. FIG. 21A shows another alternative MCE ring 462 having portions 461 made of suitable MCE material and portions 489 (FIGS. 21B and 21C) made of material having high thermal conductivity. For example, portions 489 may be made of copper, silver, aluminum, graphite, graphite fiber, graphene, or other suitable material. The transverse dimension "X" of the portions 489 is preferably made comparable to or smaller than the thickness "T" of the MCE ring 462 (FIG. 21C). The portions 489 may be formed as a cylinder (FIG. 21B), prism, parallel-piped, cones, or pyramids, or other suitable shapes. The portions 489 may enhance the conductive heat transfer between the interior of the MCE material of the MCE ring 462 and the flat surfaces of the MCE ring 462, thus mitigating the limited thermal conductivity of typical MCE materials. This may beneficially allow for a substantial increase of the thickness "T" of the MCE ring 462, and/or substantial increase of the speed of rotation of the MCE ring 462. In either case, an increased refrigeration power may be obtained.

Figure 22:
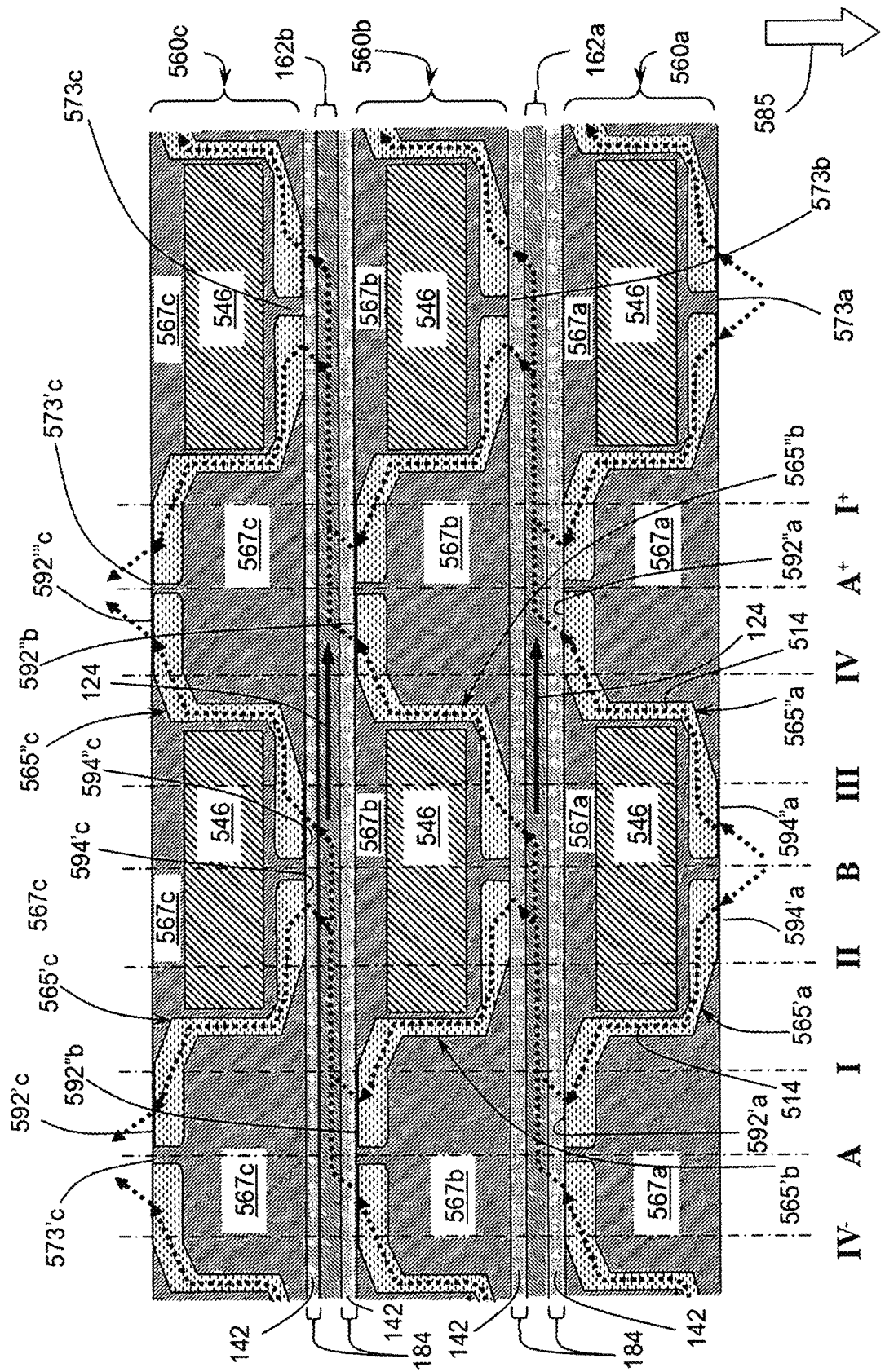
FIG. 22 is a cross-sectional view of a portion of the MCR of FIG. 1 showing another alternative heat commutators suitable for heat transport by a vapor flow.
Figure 23:
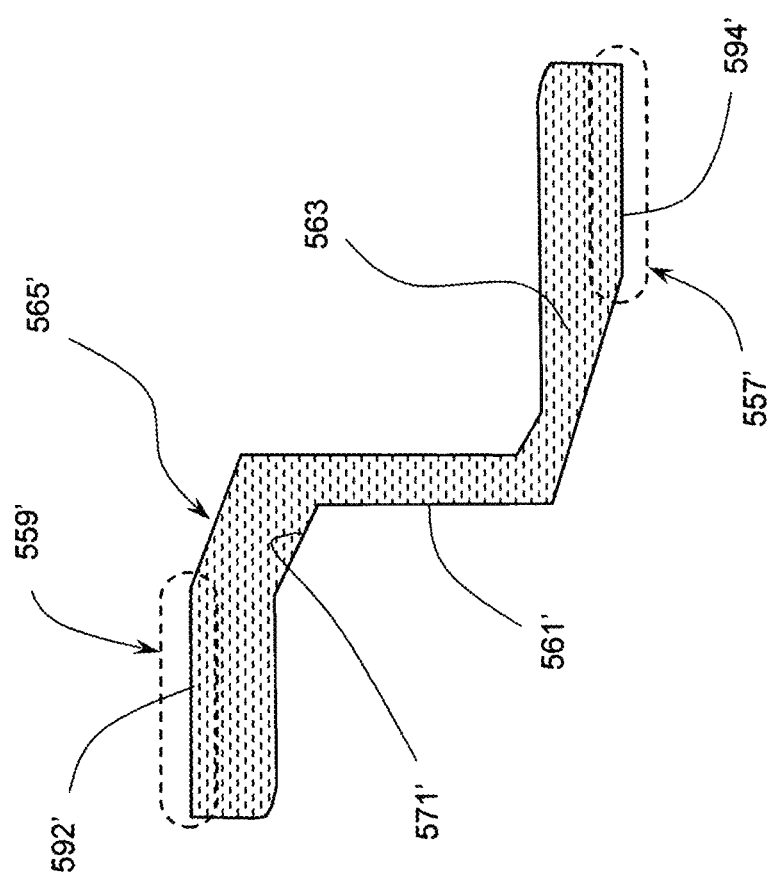
FIG. 23 is a view of one thermally conducting element
Figure 24:
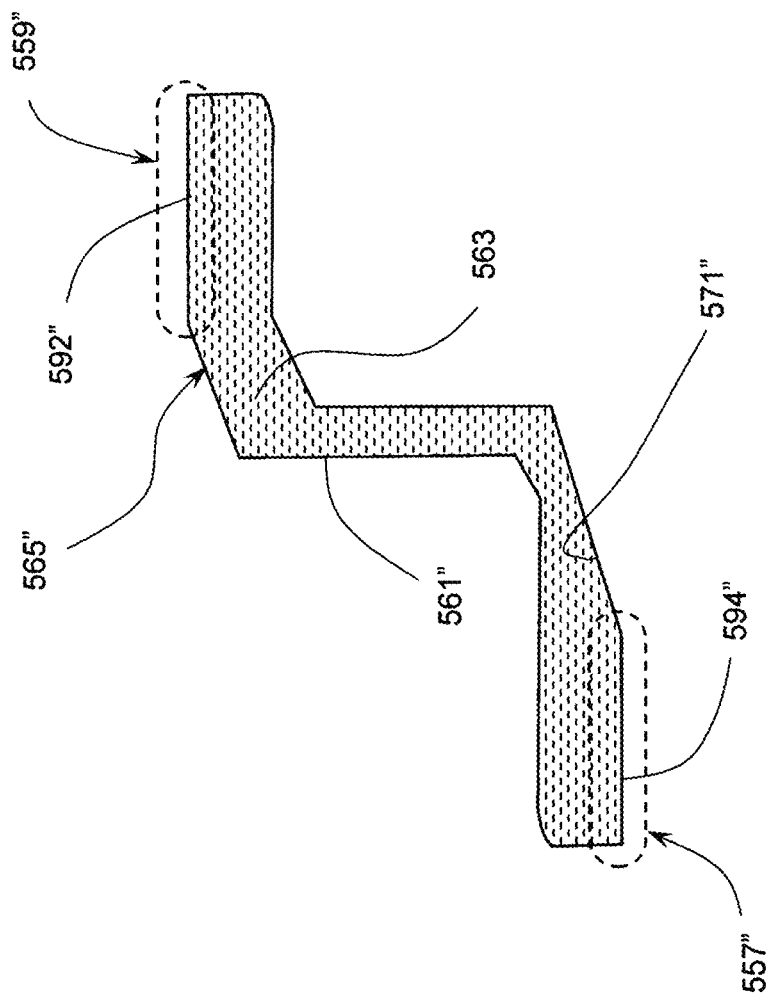
FIG. 24 is a view of another thermally conducting element.

Referring now to FIG. 22, there is shown an azimuthal section (similar to the section shown in FIG. 18) through a portion of an MCER of the subject invention showing another alternative heat commutators 560. The three (3) commutators 560 shown in the FIG. 22 are identified by suffix letters a, b, and c as 560a, and 560b, and 560c. Because the commutators 560a, and 560b, and 560c are essentially identical, the suffix letters may be omitted in the text below when referring to all the commutators. The suffix letters may be used when describing the interaction between the commutators and other components. The commutator 560 comprises a commutator structure 567, magnets 546, and thermally conducting elements 565' and 565". The commutator structure 567 is made of substantially thermally insulating materials. For example, the commutator structure 567 may be made of plastic such as PVC, Nylon®, Teflon®, or other suitable materials. The thermally conducting elements 565' and 565" are formed within thermally insulating commutator structure 567 to provide for transport of heat between the large surfaces of the thermally insulating commutator structure 567 interfacing the MCE rings 162. Referring now FIG. 23, there is shown a thermally conducting element 565' fashioned as a closed vessel 561' having a wall 571' and being filled with a suitable working fluid 563. The wall 571' may be at least in-part made of thermally conducting material such as copper. The working fluid 563 is appropriately selected and provided at a suitable pressure so that at the working temperature of the thermally conducting elements 565' a substantial portion of the working fluid is in a vapor form and a substantial portion of it is in a liquid form. Examples of suitable working fluid 563 may include members of the alcohol family (e.g., ethanol, methanol, propanol, butanol), ammonia, acetone, members of the Freon® family, and water. The thermally conducting element 565' is arranged to operate as a heat pipe having an evaporator portion 557' and a condenser portion 559'. The evaporator portion 557' comprises a contact surface 594' formed on the exterior portion of the wall 571'. The condenser portion 559' comprises a contact surface 592' formed on the exterior portion of the wall 571'. Thermally conducting element 565' may further comprise a wick (not shown) to return the liquid portion of the working fluid (also known as condensate) from the condenser portion 559 to the evaporator portion 557. Alternatively, gravity may be used in lieu of a wick. FIG. 24 shows a thermally conducting element 565". The thermally conducting element 565" from is identical but a mirror image of the thermally conducting element 565'. The thermally conducting elements 565' and 565" are separated from each other by separators 573 and 573'.

Figure 25B:
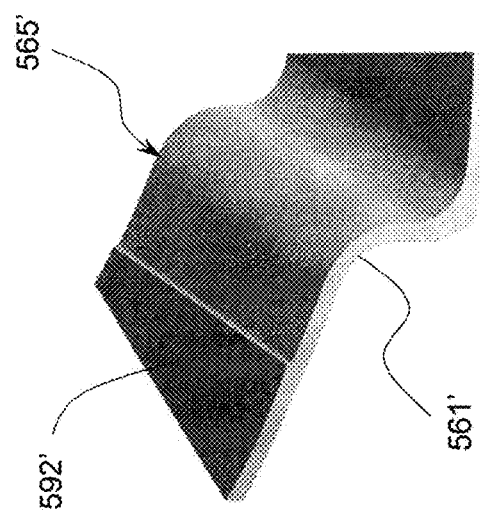
FIG. 25B is an isometric views of one thermally conducting element from another view angle.
Figure 25A:
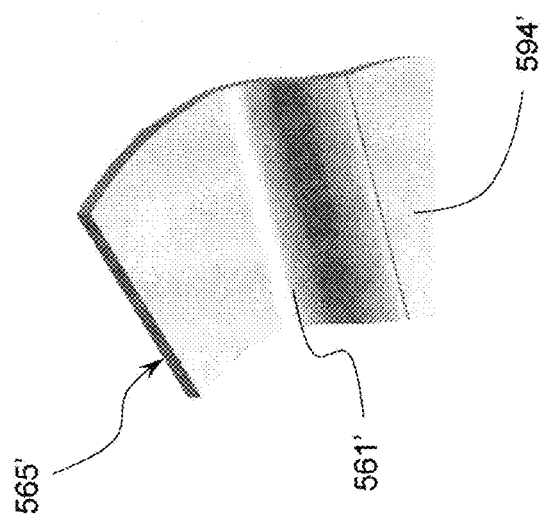
FIG. 25A is an isometric views of one thermally conducting element from one view angle.
Figure 26:
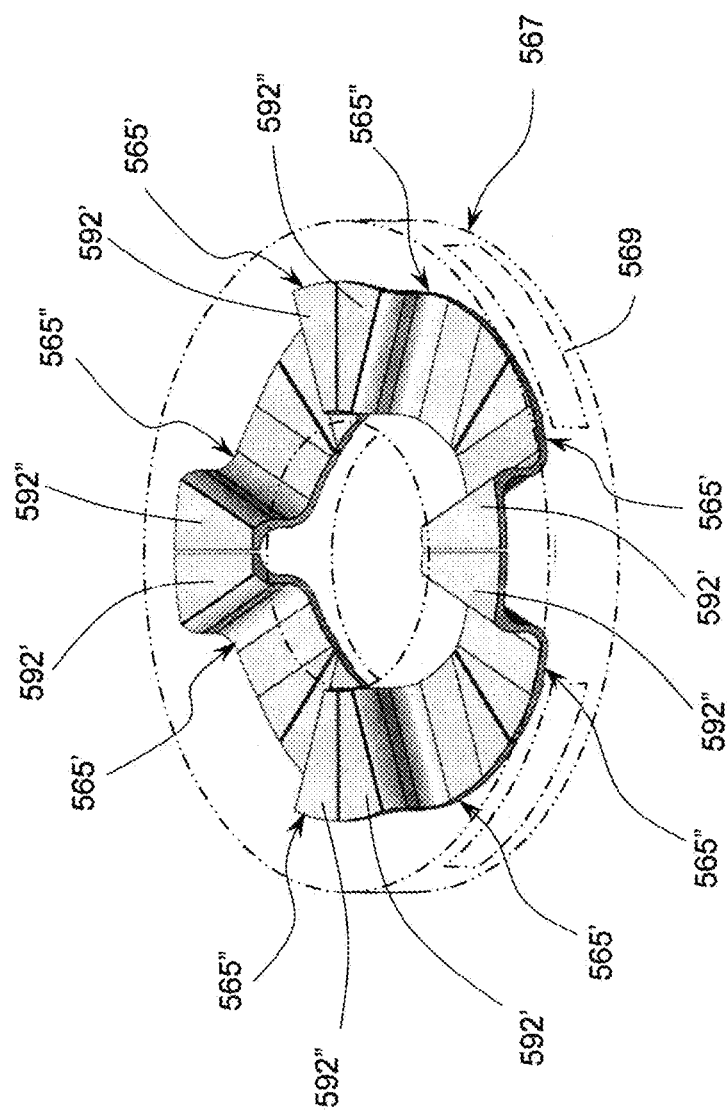
FIG. 26 is a view of an arrangement of eight (8) thermally conductive elements in an exemplary heat commutator.

FIGS. 25A and 25B show isometric views of the thermally conducting element 565' from different view angles from two different angles. A commutator 560 may comprise one or more of thermally conducting elements 565' or 565". FIG. 26 shows an arrangement of eight (8) thermally conductive elements 565 in an exemplary commutator structure 567. Note the commutator structure 567 having pockets 569 for installation of magnets 546.

Referring now again to FIG. 22, each thermally conducting element 565' is arranged so that the contact surface 594' of the evaporator portion 557' (FIG. 23) is located in the region of relatively high and substantially constant magnetic field (Zone II-B), whereas the contact surface 592' of the condenser portion 559' is located in the region of relatively low and substantially constant magnetic field (Zone A-I). Similarly, each thermally conducting element 565" is arranged so that the contact surface 594" of the evaporator portion 557" is located in the zone of relatively high and substantially constant magnetic field (Zone B-III), whereas the contact surface 592" of the condenser portion 559" is located in the zone of relatively low and substantially constant magnetic field (Zone IV-A$^+$). (See FIG. 15 for zone identification.) For example, the contact surface 594'$b$ of the evaporator portion 557'$b$ of the thermally conducting element 565'$b$ is thermally coupled via the thermal interface fluid (TIF) 142 inside the gap 184 with a portion of the MCE ring 162$a$ immersed in relatively high and substantially constant magnetic field (Zone II-B), whereas the contact surface 592'$b$ of the evaporator portion 557'$b$ of the thermally conducting element 565'$b$ is thermally coupled via the TIF 142 inside the gap 184 with a portion of the MCE ring 162$b$ immersed in relatively low and substantially constant magnetic field (Zone A-I). Thus, the thermally conducting element 565'$b$ thermally couples a portion of the MCE ring 162$a$ immersed in relatively high and substantially constant magnetic field (Zone II-B) to a portion of the MCE ring 162$b$ immersed in relatively low and substantially constant magnetic field (Zone A-I).

In operation, the motion of the MCE rings 162 as indicated by arrows 124 carries given portions of the MCE rings 162 alternately to a zone of relatively low and constant magnetic field, and a zone of relatively high and constant magnetic field. As previously explained, due to the magnetocaloric effect, a portion of the MCE ring 162 warms up as the magnetic field in which it is immersed increases and it cools down as the magnetic field in which it is immersed decreases. The thermally conducting elements 565' and 565" thermally couple a relatively warmer portion of one MCE ring 162 to a relatively cooler portion of an adjacent MCE ring 162, thus enabling a flow of heat from the former MCE ring 162 to the latter. In particular, the thermally conducting element 565'$b$ thermally couples a relatively warmer portion of the MCE ring 162$a$ immersed in relatively high and substantially constant magnetic field (Zone II-B) to a relatively cooler portion of the MCE ring 162$b$ immersed in relatively low and substantially constant magnetic field (Zone A-I). Similarly, the thermally conducting element 565"$b$ thermally couples a relatively warmer portion of the MCE ring 162$a$ immersed in relatively high and substantially constant magnetic field (Zone B-III) to a relatively cooler portion of the MCE ring 162$b$ immersed in relatively low and substantially constant magnetic field (Zone IV-A$^+$). As a result, heat flows from a relatively warmer portion of MCE ring 162$a$ a relatively cooler portion of MCE ring 162$b$. The resulting path for transporting the heat in the MCR of the subject invention using the are shown as dotted lines and arrows 514 in FIG. 22.

Figure 27:
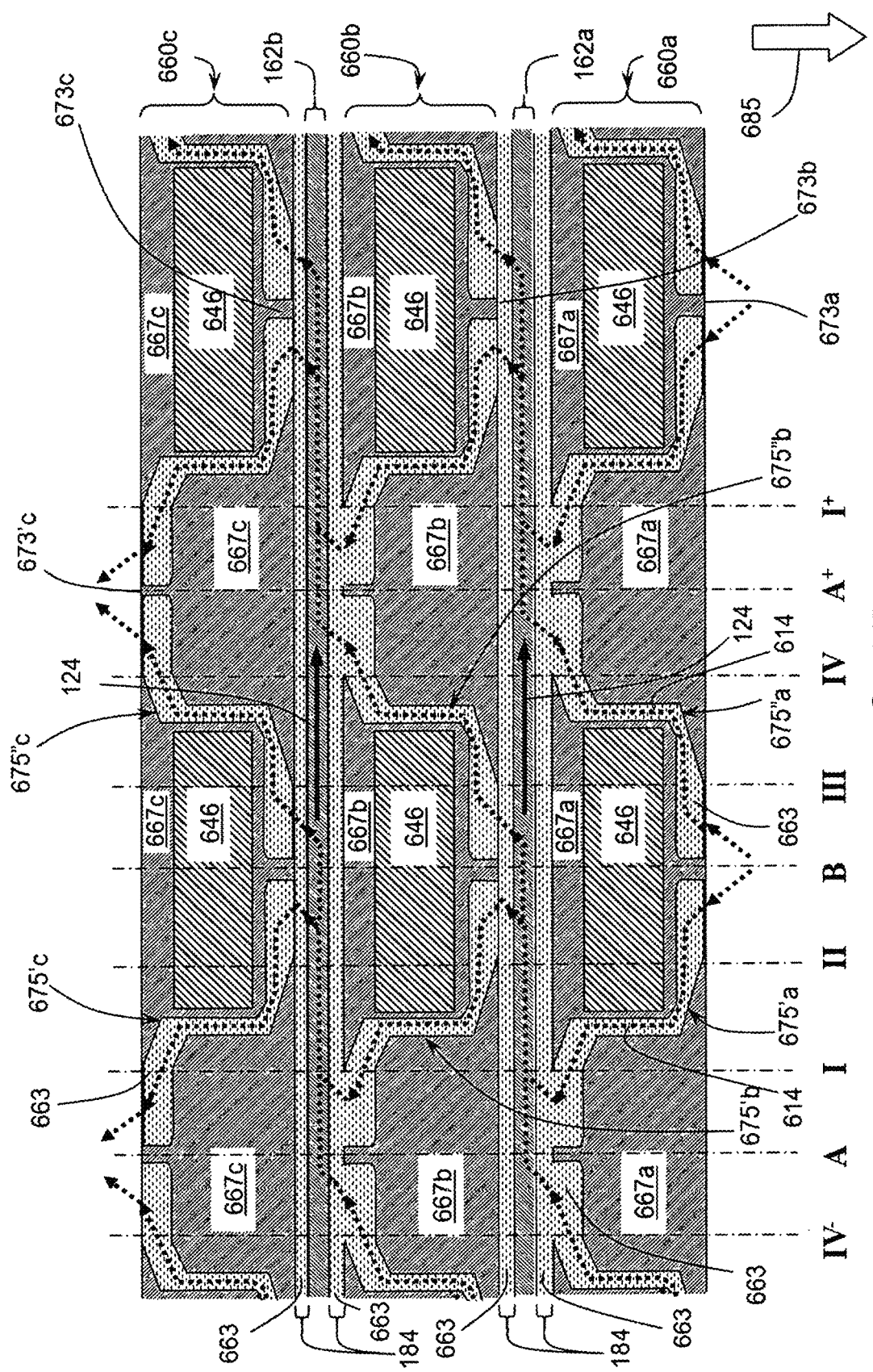
FIG. 27 is a cross-sectional view of a portion of the MCR of FIG. 1 showing yet another alternative heat commutators.
Figure 28B:
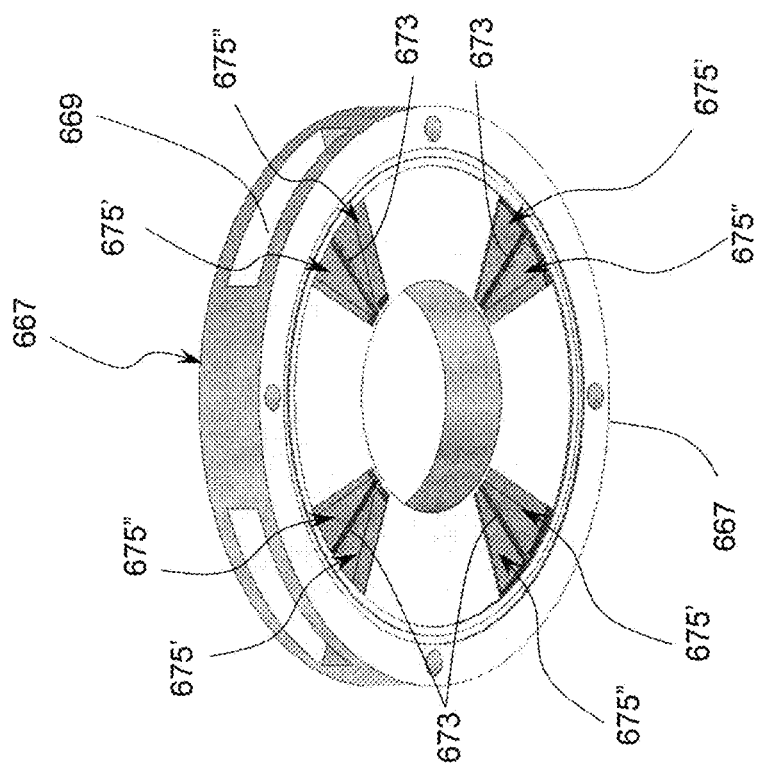
FIG. 28B is an isometric views of an exemplary heat commutator of FIG. 28A with the reverse side facing up.
Figure 28A:
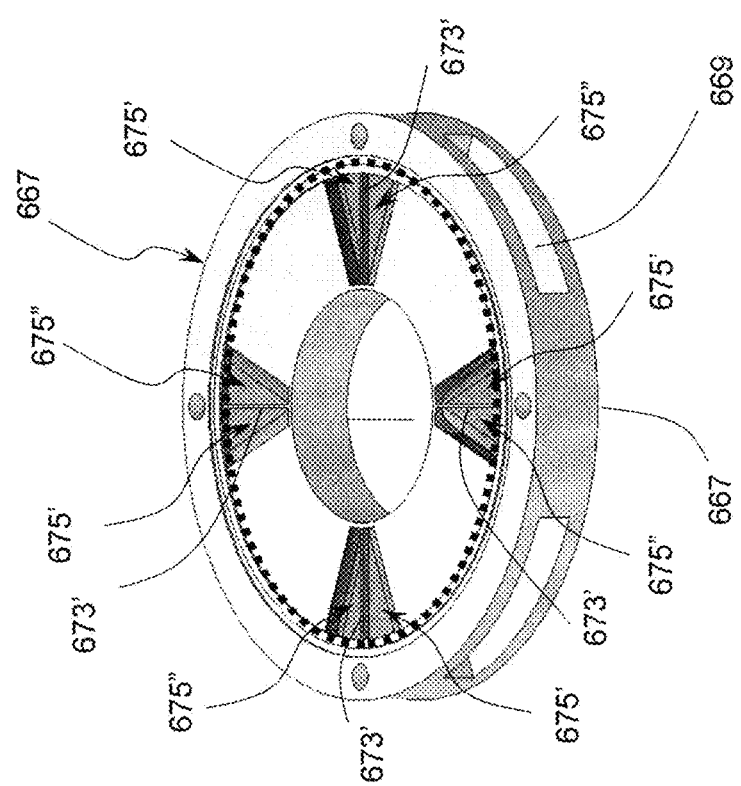
FIG. 28A is an isometric views of an exemplary heat commutator with one side facing up.
Figure 29:
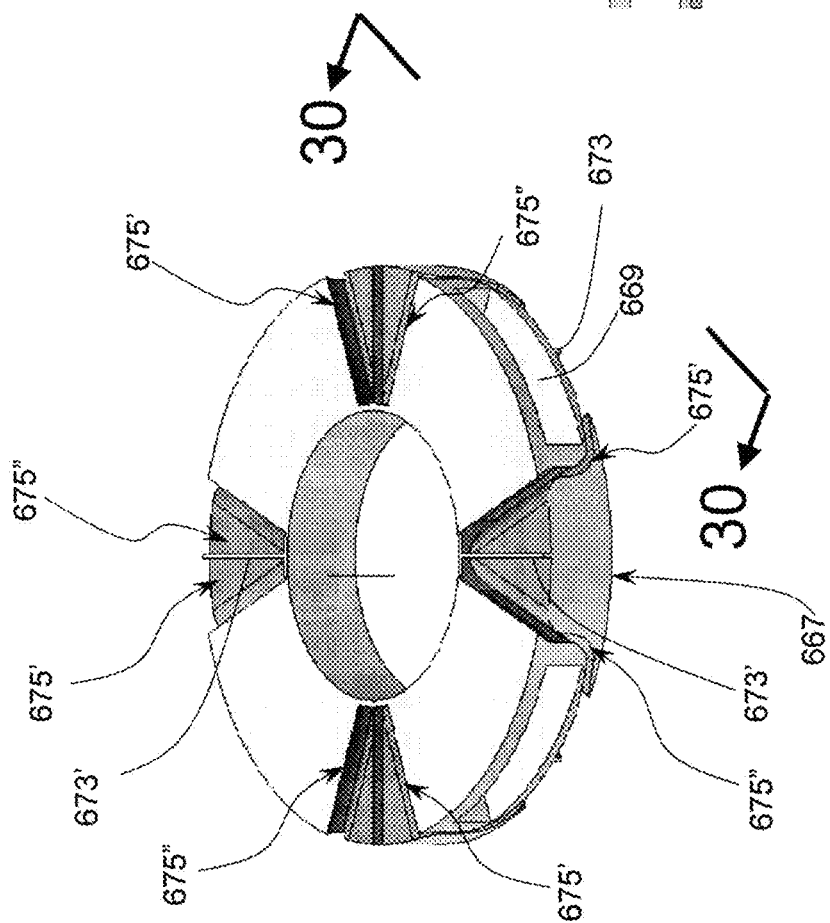
FIG. 29 is an isometric azimuthal section of the view shown in FIG. 28A with the perimetral portion outside the heavy dotted circle being removed to expose the internal passages.
Figure 30:
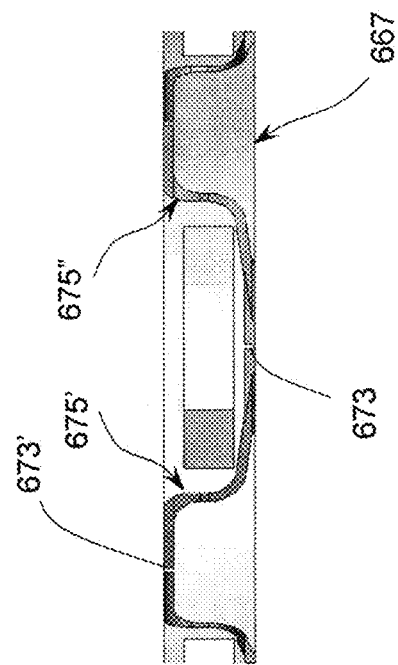
FIG. 30 is a side view 30-30 of the isometric azimuthal section shown in FIG. 29.

Referring now to FIG. 27, there is shown a planar view of an azimuthal section (similar to the section shown in FIG. 22) through a portion of an MCER of the subject invention showing yet another alternative heat commutators 660. The three (3) commutators 660 shown in the FIG. 22 are identified by suffix letters a, b, and c as 660$a$, and 660$b$, and 660$c$. Because the commutators 660$a$, and 660$b$, and 660$c$ are essentially identical, the suffix letters may be omitted in the text below when referring to all the commutators. The suffix letters may be used when describing the interaction between the commutators and other components. The commutator 660 comprises a commutator structure 667 and magnets 646. The commutator structure 667 comprises passages 675' and 675" formed within it. The commutator structure 667 is made of substantially thermally insulating material. For example, the commutator structure 667 may be made of plastic such as PVC, Nylon®, Teflon®, or other suitable materials. The passages 675' and 675" are formed within thermally insulating commutator structure 667 fluidly couple the large surfaces of the commutator structure 667, which are interfacing the MCE rings 162. The passage 675" from is identical but a mirror image of the thermally conducting element 675'. FIGS. 28A and 28B show isometric views of an exemplary commutator structure 667 respectively looking down and looking up with respect to the view in FIG. 27. FIG. 29 is an isometric azimuthal section of the view shown in FIG. 28A with the perimetral portion removed to further expose the passages 675' and 675". FIG. 30 is a view 30-30 shown in FIG. 29.

Figure 31:
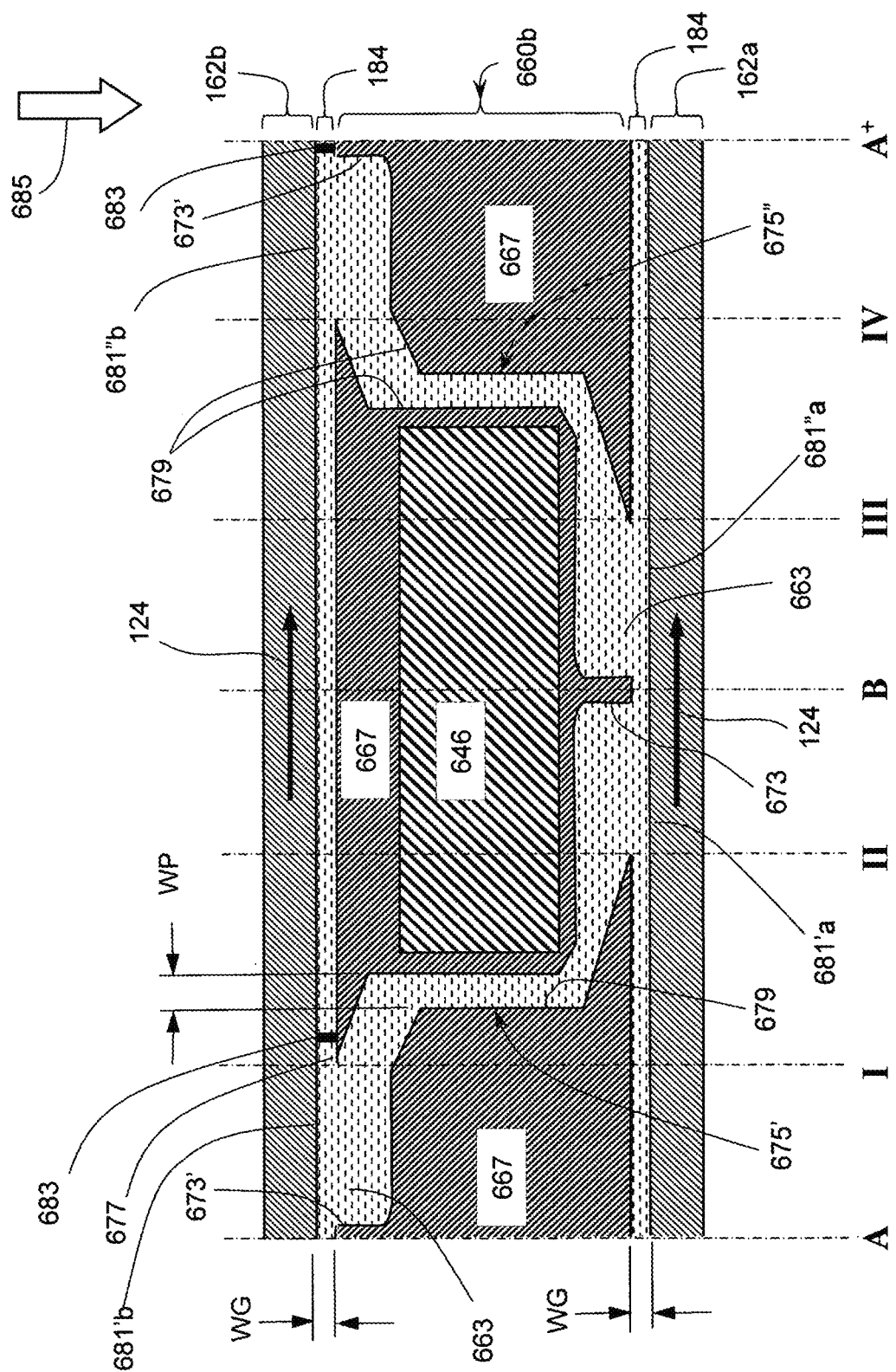
FIG. 31 is a view of an enlarged portion of the middle commutator of FIG. 27 and the adjacent MCE rings.

Referring now FIG. 31, there is shown an enlarged portion of the middle commutator 660$b$ of FIG. 27 and the adjacent MCE rings 162$a$ and 162$b$ in the zone A-A$^+$. The passages 675' and 675" have walls 679 formed by the commutator structure 667. The passages 675' and 675" have a typical width WP. The passages 675' and 675" are open to the MCE rings 162a and 162b. The passages 675' and 675" are separated from each other by separators 673 and 673'. Some variants of the invention may be practices without the separators. The passages 675' and 675" may also comprise wick(s) as is commonly practiced in heat pipes. Each of the MCE rings 162a and 162b is separated from the commutator structure 667 by a small gap 184. The 184 gap has a width WG, which preferably smaller than about 0.010 inch (about 0.25 millimeter). In some variants of the invention the gap width WG may be extremely small and the MCE rings 162a and 162b may glide on the surfaces of the commutator structure 667. For this purpose, the commutator structure 667 may be made of a material having a low friction coefficient such as Nylon® or Teflon®. Alternatively, surfaces of commutator structure 667 which are interfacing the MCE rings 162a and 162b may be coated with a low friction coating. The gap width WG should be much smaller (preferably at least 10 times smaller) than the width WP of the passages 675' and 675".

Unlike the variants of the invention shown in FIGS. 18, 22, this variant of the invention does not use a thermal interface fluid (TIF). In particular, the gaps 184 are fluidly connected with the passages 675' and 675". The gaps 184 together with the passages 675' and 675" are filled with working fluid 663. The working fluid 663 is appropriately selected and it is provided at a suitable pressure so that at the working temperature range of the MCE rings 162a and 162b a substantial portion of the working fluid 663 is in a vapor form and a substantial portion of it is in a liquid form. Examples of suitable working fluid 663 may include compatible working fluids practiced in heat pipes such as members of the alcohol family (e.g., ethanol, methanol, propanol, butanol), ammonia, acetone, members of the Freon® family, pentane, and water. If the invention is practiced at cryogenic temperature, examples of suitable working fluid 663 may also include ethane, krypton, methane, oxygen, argon, nitrogen, neon, hydrogen, and helium. Guidance for selection of a suitable working fluid for the invention may be found in "Heat Pipe, selection of working fluid" by Per Wallin, of Dept. of Energy Sciences, Faculty of Engineering, Lund University, Box 118, 22100 Lund, Sweden, Project Report, MVK160 Heat and Mass Transfer, May 7, 2012, Lund, Sweden, which is hereby incorporated by reference in its entirety.

In operation, the MCE rings 162a and 163b rotate as indicated by arrows 124. As a result, portions of the MCE rings 162a and 163b are alternately to exposed to high strength magnetic field and low strength magnetic field. Due to the magnetocaloric effect, an MCE ring portion entering a region of high magnetic field is warming up, whereas an MCE ring portion entering a region of low magnetic field is cooling down. Heat is transported from the relatively warm portions of the MCE disk 162a to the relatively cool portions of the MCE ring 162b as follows: Working fluid 663 in liquid form present on relatively warm portions of the MCE ring 162a in zone II-III partly evaporates and the resulting vapor enters passages 675' and 675". Working fluid 663 in vapor form present in passages 675' and 675" at least in-part condenses on the relatively cool surfaces of MCE ring 162b in zones A-I and IV-A$^+$.

In particular, surface 681'a of the MCE ring 162a is at least partially coated with a film of working fluid 663 in a liquid form (condensate). A portion of the MCE ring 162a moving in a direction indicated by arrow 124 is entering a stronger magnetic field in zone I-II and it is warming up in the process. However, evaporation of the working fluid 663 on the surface 681'a in zone I-II is substantially impeded by the narrow width of the gap 184. As the warm portion of the MCE ring 162a now enters the zone II-B, the passage 675' allows for removal of working fluid 663 vapor. As a result, the evaporation rate of the working fluid 663 from the surface 681'a increases and the resulting vapor (carrying heat removed from MCE ring 162a) enters the passage 675'. Concurrently, a portion of MCE ring 162b in zone A-I is relatively cool because it just departed from a region of high magnetic field to a region of low magnetic field (zone IV$^-$-I, FIG. 27). A portion of the working fluid 663 present in vapor form inside the passage 675' partly condenses on the surface 681'b of the relatively cool portion of the MCE ring 162b in zone A-I and deposits heat into the ring. As the MCE ring 162b moves further in the direction indicated by arrow 124, the condensate is wiped off from the surface 681'b by the edge 677. Alternatively, a wiper 683 may be used to wipe the condensate from the surface 681'b. A suitable wiper 683 may be made of soft plastic such a silicon rubber or a felt material or may be formed as a brush. Working fluid 663 condensate wiped-off from the surface 681'b is returned to the passage 675' and transported to the surface 681'a of the MCE ring 162a either by gravity (direction indicated by arrow 685) or by a wick (not shown) within the passage 675'. In the process, the portion of the MCE ring 162a in zone II-B becomes slightly less warm while the portion of the MCE ring 162b in zone A-I becomes slightly less cool.

Similarly, a portion of the MCE ring 162a moving in a direction indicated by arrow 124 is shifting from zone II-B to zone B-III. The magnetic field in zone B-III is at about the same level as in zone II-B. On the average, the MCE ring 162a portion in zone B-III is slightly less warm than in zone II-B because some heat was removed from it by evaporation of working fluid in zone II-B. As the warm portion of the MCE ring 162a now enters the zone B-III, the passage 675" allows for removal of working fluid 663 vapor. As a result, the evaporation rate of the working fluid 663 from the surface 681"a increases and the resulting vapor (carrying heat removed from MCE ring 162a) enters the passage 675". Concurrently, a portion of MCE ring 162b in zone IV-A$^+$ is relatively cool because it just departed from a region of high magnetic field (zone II-III) to a region of low magnetic field (zone IV-I$^+$, FIG. 27). A portion of the working fluid 663 present in vapor form inside the passage 675" partly condenses on the surface 681"b of the relatively cool portion of the MCE ring 162b in zone IV-A$^+$ and deposits heat into the ring. As the MCE ring 162b moves further in the direction indicated by arrow 124, the condensate is wiped off from the surface 181b by the separator 673' and/or by a wiper 683. Working fluid 663 condensate wiped-off from the surface 681"b is returned to the passage 675" and transported to the surface 681"a of the MCE ring 162a either by gravity (direction indicated by arrow 685) or by a wick (not shown) within the passage 675". In the process, the portion of the MCE ring 162a in zone B-III becomes slightly less warm while the portion of the MCE ring 162b in zone IV-A$^+$ becomes slightly less cool. Undesired condensation of the working fluid 663 vapor on the commutator structure 667 may be substantially reduced by applying anti-condensation coating on the walls 679 of the passages 675' and 675", and on any the desired portions of the commutator structure 667. Suitable anti-condensation coating may be obtained from Mascoat Industrial, Houston, Tex. Note that the combination of the passage 675', gap 184, the MCE rings 162a and 162b, and working fluid 663 substantially forms an element known as a "heat pipe". In the same fashion, the combination of the passage 675", gap 184, the MCE rings 162a and 162b, and working fluid 663 substantially forms an element known as a "heat pipe". Each combination operates as a heat pipe by evaporating a working fluid liquid on MCE ring 162a and condensing it on MCE ring 162b. Therefore, each of these combinations may be properly referred to as a "heat pipe."

To improve evaporation and condensation rates of working fluid 663 on MCE rings 162, the surface of the MCE rings 162 can be equipped with micro-scale surface extensions micro-texturing to enlarge the effective surface area. Such a surface preparation on surface 181a may be also beneficial for improved holding of the condensate.

Figures 32A, 32B:
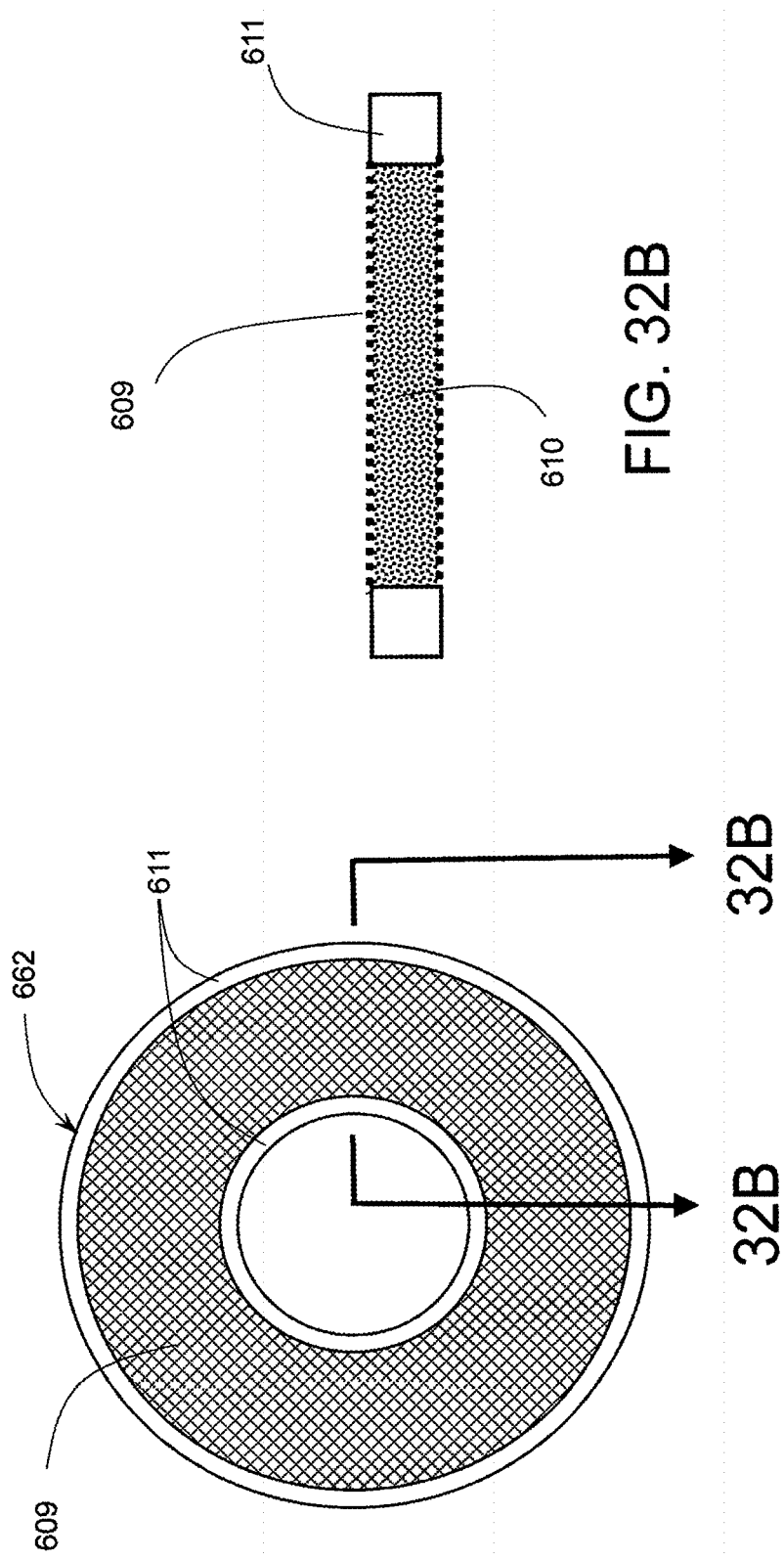
FIG. 32A is a view of an alternative MCE ring suitable for use with granular MCE material.
FIG. 32B is a cross-sectional view 32B-32B of the alternative MCE ring of FIG. 32A.

The MCE ring for use with the evaporative working fluid 663 may be beneficially use MCE material in granular form. In particular, certain commercial MCE materials such as the above noted Calorivac-H are only available in granular form. Granular material offers much larger surface area for heat transfer than a comparable monolithic bulk material. Furthermore, if the granules are sufficiently small, the path for heat conduction from into the material to the surface can also be much shorter than in a comparable monolithic bulk material. FIG. 32A shows a view of an MCE ring 662 suitable for holding granular MCE material. FIG. 32B shows the cross-sectional view 32B-32B exposing the structural members 611, granular MCE material 610, and retaining screens 609. The screens 609 may be provided as a perforated metal, wire mesh, woven fabric, non-woven fabric, or in other suitable form that is easily permeable by the working fluid 663.

Figure 33:
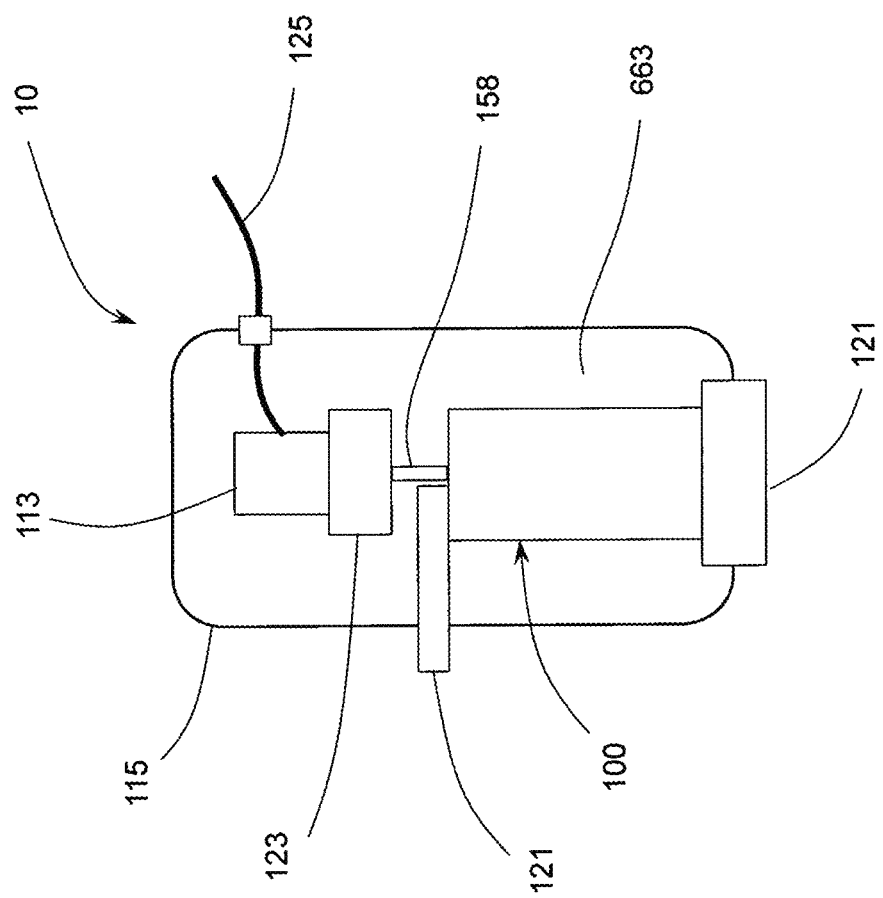
FIG. 33 is a schematic diagram of the MCR apparatus of the subject invention.

Referring now to FIG. 33, there is shown a schematic diagram of a magnetocaloric refrigeration system 10 of the subject invention using the commutators shown in FIG. 22 comprising a hermetically sealed vessel 115, SMCR 100, electric motor 113, reduction gear box 123, drive shaft 158, electrical feedthrough 117 for feeding electrical wires 125, cold thermal interface 119, and hot thermal interface 121. The MCR 100, the electric motor 113, and the gear box 123 are enclosed inside the vessel 115. The electrical feedthrough 117, cold thermal interface 119, and hot thermal interface 121 are formed into the wall of the vessel 115. The hot interface 121 may be a thermal conductor, a heat pipe, or a convective flow loop preferably well thermally insulated from the vessel wall 155. The cold interface 119 may be a thermal conductor, a heat pipe, or a convective flow loop preferably thermally insulated from the vessel wall 155. The vessel 150 may be substantially filled with a suitable working fluid 663. The cold thermal interface 119 is thermally coupled to the portion of MCR 100 operating at a lower temperature. The hot thermal interface 121 is thermally coupled to the portion of MCR 100 operating at a higher temperature. For refrigeration purposes, the cold thermal interface 119 may be externally thermally coupled to a heat load and the hot thermal interface 121 may be externally thermally coupled to a heat sink. For heat pumping purposes, the cold thermal interface 119 may be externally thermally coupled to a heat sink and the hot thermal interface 121 may be externally thermally coupled to a heat load. As an option, the electric motor 113 may be located outside the vessel 115 and mechanically rotationally coupled to the gearbox 123 via hermetically sealed rotary motion feedthrough (not shown).

Figure 34:
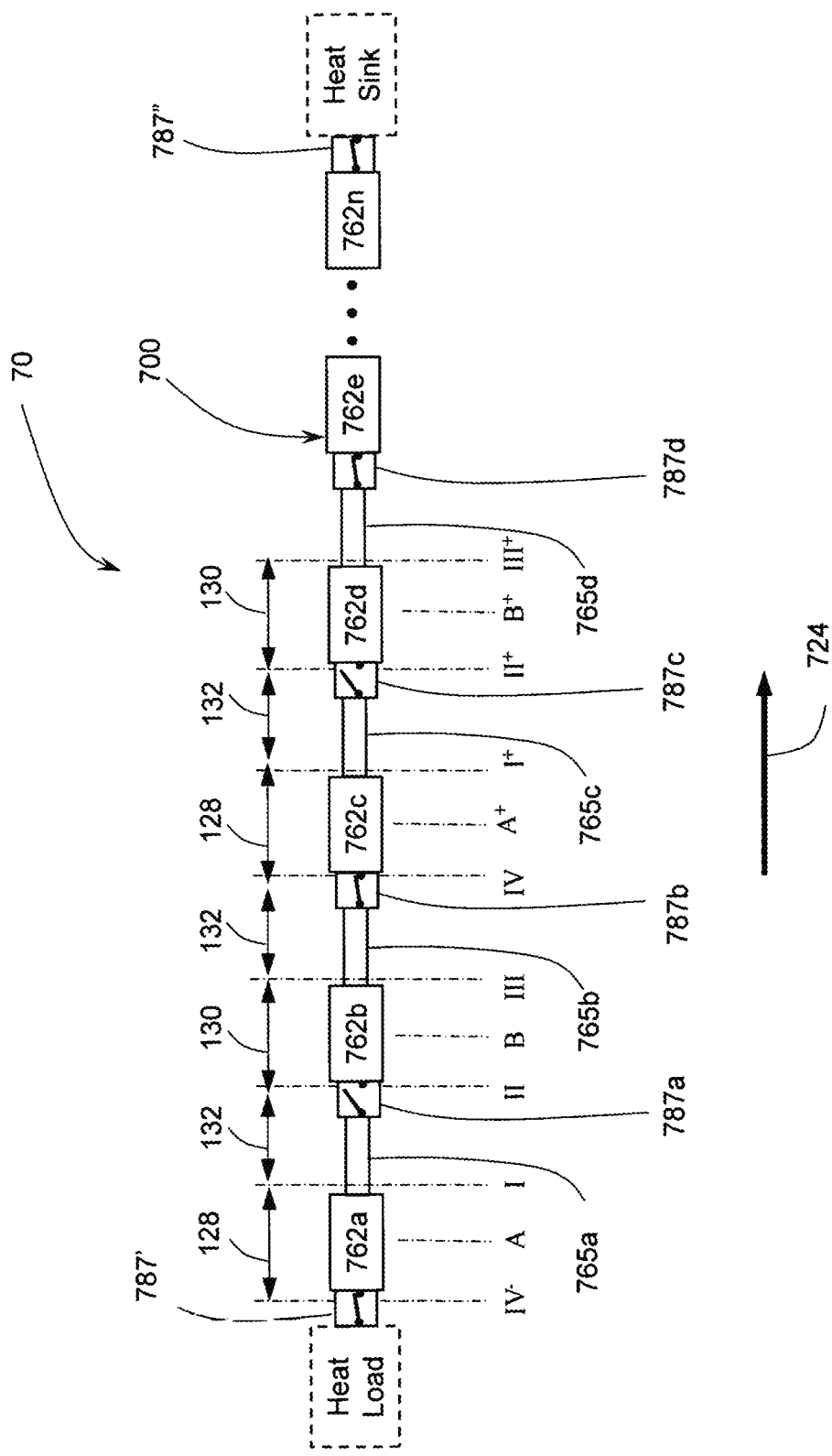
FIG. 34 is a schematic diagram of alternative embodiment of the MCR apparatus of the subject invention shown in a specific alignment with respect to the magnetic field.
Figure 35:
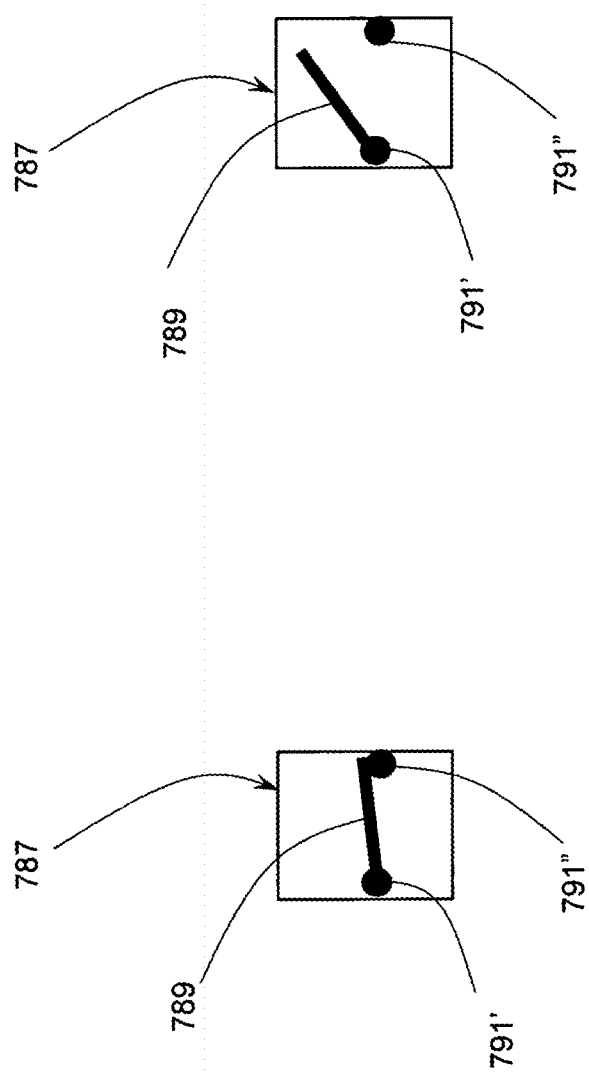
FIG. 35A is a schematic diagram of a heat switch in a closed position.
FIG. 35B is a schematic diagram of a heat switch in an open position.

Referring now to FIG. 34, there is shown a schematic diagram of a magnetocaloric refrigeration system 70 of the subject invention in accordance with one preferred embodiment of the present invention. The magnetocaloric refrigeration system 70 comprises a plurality (n) of magnetocaloric elements 762a, 762b, 762c, and 762d to 762n; a plurality (n) of thermally conducting elements 765a, 765b, 765c, and 765d to 765n; and a plurality (n) of heat switches 787a, 787b, 787c, and 787d to 787n, where n can be an arbitrary number. Each two adjacent magnetocaloric elements 762 are connected via a thermally conducting element 765 and a thermal switch 787 arranged in series. The thermally conducting element 765 is thermally coupled to the adjacent magnetocaloric element 762 and to one side of the adjacent heat switch 787. The other side of the heat switch 787 is thermally coupled to another adjacent magnetocaloric element 762. Referring now to FIGS. 35A and 35B, there is shown a heat switch 787 comprising the terminals 791' and 791", and a moving contact 789. The terminal 791' may be thermally coupled to the thermally conducting element 765 and the terminal 791' may be thermally coupled to the magnetocaloric element 762. The moving contact 789 can be arranged to mutually thermally couple the terminals 791' and 791" as shown in FIG. 35A. As a result, in the condition shown in FIG. 35A, the terminals 791' and 791" are in a good thermal communication with each other. Alternatively, the moving contact 789 can be arranged to mutually thermally disconnect (decouple) the terminals 791' and 791" as shown in FIG. 35B. As a result, in the condition shown in FIG. 34B, the terminals 791' and 791" are substantially thermally insulated from each other. Suitable mechanical switches using sliding contacts wetted by liquid metal are described by the Applicant in the U.S. Pat. No. 9,702,594 issued on Jul. 11, 2017 and entitled "Magneto-Caloric Refrigerator," the entire contents of which is hereby incorporated by reference.

Figure 36:
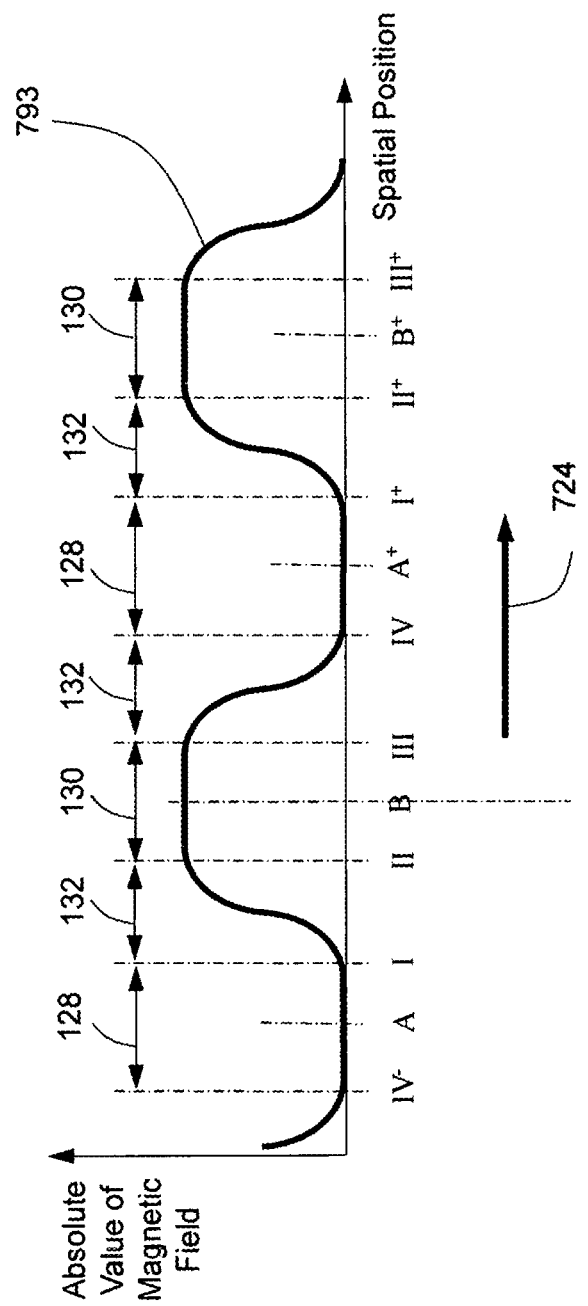
FIG. 36 is a diagram of a an absolute field strength of spatially periodic magnetic field showing the undulations.

Referring now back to FIG. 34, the magnetocaloric refrigeration system 70 further comprises a means for generating spatially periodic magnetic field with a spatial distribution generally depicted by the curve 793 in FIG. 36. Note that FIG. 36 is analogous to and an extension of FIG. 15. Suitable periodic magnetic field may be a sine wave, square wave, rectangular wave, triangular wave, trapezoidal wave, or alike. For refrigeration purposes, the magnetocaloric element 762a may be thermally coupled to a low-temperature heat load via a heat switch 787' and the magnetocaloric element 762n may be thermally coupled to a heat sink via a heat switch 787". The thermally conducting elements 765 may be made of a solid-state thermal conductor such as metal (namely copper or aluminum) or carbon fibers, or nonmaterial. Alternatively, the thermally conducting elements 765 may be formed as heat pipes. As another alternative, the thermally conducting elements 765 may be formed as "diode heat pipes," which have a high thermal conductivity in the forward direction, and a low thermal conductivity in the reverse direction. When diode heat pipes are used, their forward direction should be aligned with the direction of heat flow in the magnetocaloric refrigeration system 70. Furthermore, when diode heat pipes are used as the thermally conducting elements 765, heat switches 797 may be omitted. Information on diode heat pipes may be found at https://www.1-act.com/diode-heat-pipes/. The magnetocaloric elements 762 comprise a suitable MCE material arranged to be in a good thermal communication with immediately adjacent thermally conducting elements 765 and with the terminal 791" of immediately adjacent heat switch 787.

In operation, the assembly 700 (FIG. 34) comprising of magnetocaloric elements 762a, 762b, 762c, and 762d to 762n; the thermally conducting elements 765a, 765b, 765c, and 765d to 765n; and the heat switches 787a, 787b, 787c, and 787d to 787n; is immersed in the spatially periodic magnetic field described above. The assembly 700 and the spatially periodic magnetic field described above are arranged to move with respect to each other in the direction indicated by arrow 724 in FIGS. 34, 36 and 37. The alignment of the undulations of the spatially periodic magnetic field is arranged to be so that when a given magnetocaloric element 762 is immersed in a relatively strong magnetic field, the immediately adjacent magnetocaloric element(s) 762 is (are) immersed in a relatively weak magnetic field.

In particular, at a given time, the magnetic field may be aligned with the assembly 700 as shown in FIG. 34, where the magnetic field features are identified with the dot-dash vertical lines having symbols I, II, III, IV, A, and B, which are defined in FIG. 36. In this particular case, the magnetocaloric element 762a is immersed in a relatively weak magnetic field, the element 762b is immersed in a relatively strong magnetic field, the element 762c is immersed in a relatively weak magnetic field, the element 762d is immersed in a relatively strong magnetic field, and so on. Due to the MCE, the magnetocaloric elements 762 immersed in a relatively strong magnetic field may be relatively warmer than the immediately adjacent elements immersed in a relatively weaker magnetic field. Concurrently, the heat switch 787' is closed to allow heat to flow from the heat load into the element 762a, while the switch 787a is open to thermally isolate the elements 762a and 762b. In addition, the heat switch 787b is closed to thermally couple the elements 762b and 762c, the heat switch 787c is open to thermally isolate elements 762c and 762d, and so on. If the element 762n is exposed to a relatively strong magnetic field, the heat switch 787" may be closed to allow heat to flow from the element 762n into the heat sink (as shown in FIG. 34). If the element 762n is exposed to a relatively weak magnetic field, the heat switch 787" may be open to thermally isolate the element 762n from the heat sink.

Figure 37:
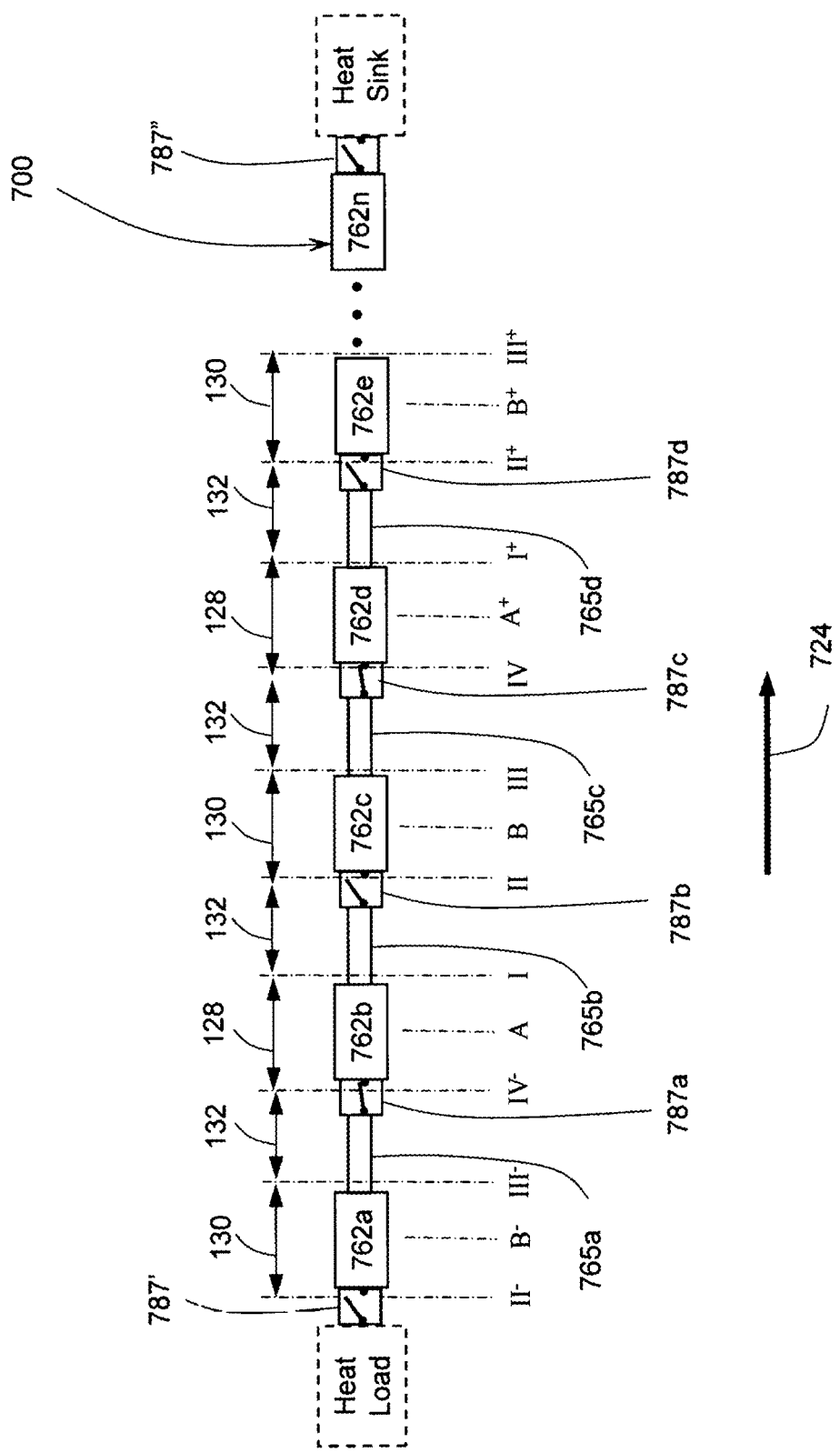
FIG. 37 is a schematic diagram of alternative embodiment of the MCR apparatus of the subject invention shown in another specific alignment with respect to the magnetic field.

At another given time, the magnetic field may be aligned with the assembly 700 as shown in FIG. 37, where the magnetic field features are identified with the dot-dash vertical lines having symbols I, II, III, IV, A, and B, which are defined in FIG. 36. In this particular case, the magnetocaloric element 762a is immersed in a relatively strong magnetic field, the element 762b is immersed in a relatively weak magnetic field, the element 762c is immersed in a relatively strong magnetic field, and the element 762d is immersed in a relatively weak magnetic field, and so on. Due to the MCE, the magnetocaloric elements 762 immersed in a relatively strong magnetic field may be relatively warmer than the immediately adjacent elements immersed in a relatively weaker magnetic field. Concurrently, the heat switch 787' is open to thermally isolate the heat load from the element 762a, and the switch 787a is closed to thermally couple the elements 762a and 762b. In addition, the heat switch 787b is open to thermally isolate the elements 762b and 762c, the heat switch 787c is closed to thermally couple the elements 762c and 762d, and so on. If the element 762n is exposed to a relatively strong magnetic field, the heat switch 787" may be closed to allow the flow of heat from the element 762n into the heat sink. If the element 762n is exposed to a relatively weak magnetic field, the heat switch 787" may be open to thermally isolate the element 762n from the heat sink (as shown in FIG. 37). When the positions of the magnetic field undulations are substantially different from those shown in FIGS. 34 and 37, all the switches 787 are preferably open to thermally isolate the elements 762. As the magnetic field undulations move in the direction of arrow 724 relative to the assembly 700, heat is removed from the heat load at a lower temperature, moved (pumped) in the direction of arrow 724, and transferred into the heat sink at a higher temperature.

Figure 39:
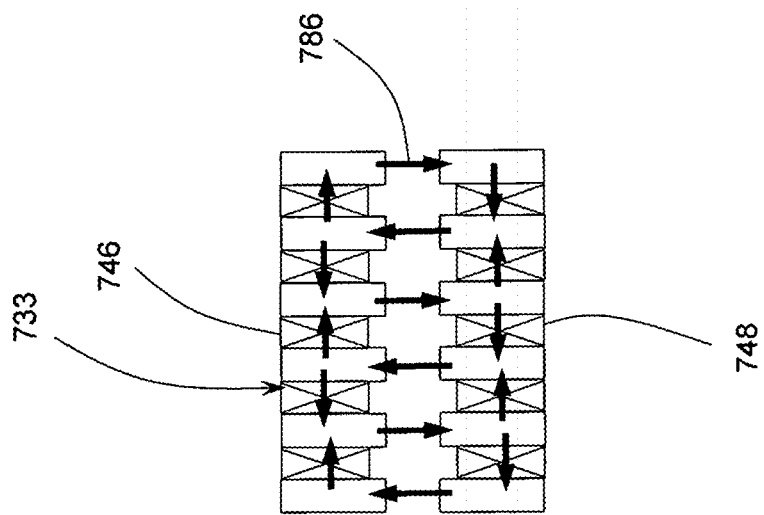
FIG. 39 is a schematic diagram of alternative magnetic structure for producing a spatially periodic magnetic field.
Figure 38:
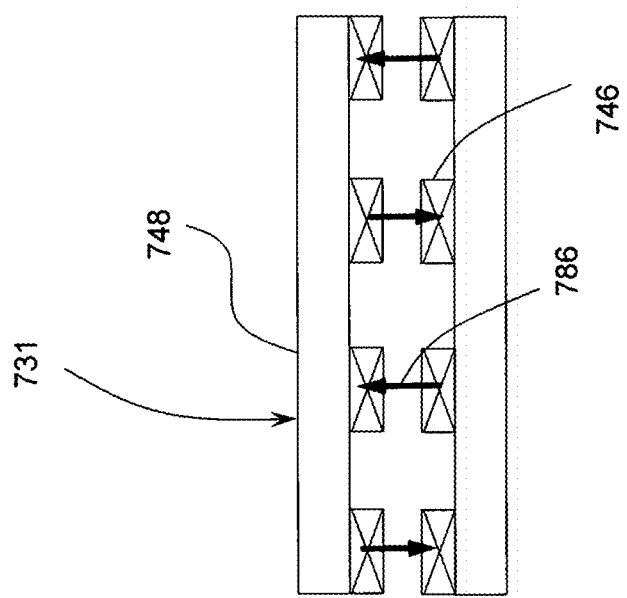
FIG. 38 is a schematic diagram of a magnetic structure for producing a spatially periodic magnetic field.

Suitable spatially periodic magnetic may be produced by magnetic structures 731 or 733 respectively shown in FIGS. 38 and 39. Each structure 731 and 733 is constructed from permanent magnets 746 and ferromagnetic material 748. The quantity of the magnets and ferromagnetic material (or the size of the ferromagnetic material) can be selected to produce a magnetic field with an arbitrary number of undulations. Arrows 786 indicate the direction of the magnetic field.

The above description of the embodiments of the present invention are merely exemplary in nature and are in no way intended to limit the invention, its application, or uses. For example, other embodiments of the invention may use linearly moving strips or plates of MCE material rather than rotating rings. Suitable linear motion may be continuous or reciprocating. As another example, yet other embodiments of the invention may use electromagnets or superconducting magnets instead (or in a combination with) permanent magnets.

Apart for refrigeration and/or pumping heat, the MCR apparatus of the subject invention may be also used to convert thermal energy into mechanical energy. Referring now to FIG. 2, the end cap 170 may be thermally connected to a suitable source of heat at a first temperature and the end cap 168 may be thermally connected to a suitable heat sink at a temperature substantially lower than the first temperature. Heat may flow through the MCR 100 from the end cap 170 to the end cap 168 in a similar way as already described. Azimuthal temperature variations in the MCE rings 162 may cause corresponding variations in the magnetization of the MCE material within the MCE rings 162. In particular, cooler portions of the MCE material may be magnetized more and may be drawn more into the space between the magnets 146, which may produce a torque on the MCE ring 162, causing it to rotate the shaft 158. MCR apparatus of the subject invention may be also used to convert low-level heat into mechanical energy, which may make it useful for energy recovery from waste heat generated by some combustion processes. Alternatively, the MCR apparatus of the subject invention may be used to convert solar heat to a mechanical energy. In particular, the shaft 158 may be coupled to an electric generator or a pump.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

The term "suitable," as used herein, means having characteristics that are sufficient to produce a desired result. Suitability for the intended purpose can be determined by one of ordinary skill in the art using only routine experimentation.

Moreover, terms that are expressed as "means-plus function" in the claims should include any structure that can be utilized to carry out the function of that part of the present invention. In addition, the term "configured" as used herein to describe a component, section or part of a device includes hardware and/or software that is constructed and/or programmed to carry out the desired function.

Different aspects of the invention may be combined in any suitable way.

While only selected embodiments have been chosen to illustrate the present invention, it will be apparent to those skilled in the art from this disclosure that various changes and modifications can be made herein without departing from the scope of the present invention as defined in the appended claims. Furthermore, the foregoing description of the embodiments according to the present invention are provided for illustration only, and not for the purpose of limiting the present invention as defined by the appended claims and their equivalents. Thus, the scope of the present invention is not limited to the disclosed embodiments.

What is claimed is:

1. A magneto-caloric refrigerator (MCR) comprising: a first magneto-caloric effect (MCE) material, a second MCE material, a thermally conducting element, a heat switch, and a plurality of magnet for generating magnetic fields;
    a) said plurality of magnet for generating magnetic fields are arranged to produce a region of weak magnetic field and a region of strong magnetic field;
    b) said thermally conducting element arranged in a series with said a heat switch to thermally couple said first MCE material and said second MCE material when said heat switch is in a closed position;
    c) said first MCE material being arranged to be exposed to a strong magnetic field when said second MCE material is exposed to a weak magnetic field;
    d) said first MCE material being arranged to be exposed to a weak magnetic field when said second MCE material is exposed to a strong magnetic field;
    e) said heat switch being arranged to be in a closed position when said first MCE material is exposed to a strong magnetic field and said second MCE material is exposed to a weak magnetic field; and
    f) said heat switch being arranged to be in an open position when said first MCE material is exposed to a weak magnetic field and said second MCE material is exposed to a strong magnetic field.

2. The MCR of claim 1, wherein said thermally conducting element uses a solid material with high thermal conductivity.

3. The MCR of claim 1, wherein said thermally conducting element comprises a heat pipe.

4. The MCR of claim 1, wherein said thermally conducting element comprises a fluid flow loop.

5. The MCR of claim 1, wherein said heat switch comprises a mechanical contact switch wherein contacts are wetted by liquid metal for improved thermal conductance.

6. The MCR of claim 1, wherein said heat switch comprises a component selected from the family consisting of a mechanical switch, a diode heat pipe, a fluid valve, and a means for fluid flow control.

7. The MCR of claim 1, wherein said means for generating magnetic field are arranged to physically move with respect to said first MCE material and said second MCE material to alternately expose said first MCE material and said second MCE material to a magnetic field of strength changing in time and position.

8. A magneto-caloric refrigerator (MCR) comprising: a first magneto-caloric effect (MCE) material, a second MCE material, a thermally conducting element, a heat switch, and a plurality of magnet for generating a spatially periodic magnetic fields;
    a) said plurality of magnet for generating spatially periodic magnetic fields are arranged to produce a region of weak magnetic field and a region of strong magnetic field;
    b) said thermally conducting element arranged in a series with said a heat switch to thermally couple said first MCE material and said second MCE material when said heat switch is in a closed position;
    c) said first MCE material being arranged to be exposed to a strong magnetic field when said second MCE material is exposed to a weak magnetic field;
    d) said first MCE material being arranged to be exposed to a weak magnetic field when said second MCE material is exposed to a strong magnetic field;
    e) said heat switch being arranged to be in a closed position when said first MCE material is exposed to a strong magnetic field and said second MCE material is exposed to a weak magnetic field; and
    f) said heat switch being arranged to be in an open position when said first MCE material is exposed to a weak magnetic field and said second MCE material is exposed to a strong magnetic field.

9. The MCR of claim 8, wherein said plurality of magnet for generating spatially periodic magnetic fields are arranged to physically move with respect to said first MCE material and said second MCE material to alternately expose said first MCE material and said second MCE material to a magnetic field of strength changing in time and position.

* * * * *